(12) United States Patent
Kaplan et al.

(10) Patent No.: US 8,206,774 B2
(45) Date of Patent: Jun. 26, 2012

(54) DIAZONIUM SALT MODIFICATION OF SILK POLYMER

(75) Inventors: David L. Kaplan, Concord, MA (US); Amanda Murphy, Somerville, MA (US)

(73) Assignee: Trustees of Tufts College, Medford, MA (US)

( * ) Notice: Subject to any disclaimer, the term of this patent is extended or adjusted under 35 U.S.C. 154(b) by 985 days.

(21) Appl. No.: 12/192,588

(22) Filed: Aug. 15, 2008

(65) Prior Publication Data

US 2009/0232963 A1 Sep. 17, 2009

Related U.S. Application Data

(60) Provisional application No. 61/077,593, filed on Jul. 2, 2008, provisional application No. 61/036,284, filed on Mar. 13, 2008.

(51) Int. Cl.
- A61L 33/00 (2006.01)
- B05D 3/00 (2006.01)
- B05D 1/40 (2006.01)
- C12N 5/00 (2006.01)
- C12N 5/02 (2006.01)
- A61K 38/17 (2006.01)

(52) U.S. Cl. ....... 427/2.24; 427/331; 435/395; 435/377; 530/353

(58) Field of Classification Search ............... 427/2.24, 427/331; 435/395, 377; 530/353
See application file for complete search history.

(56) References Cited

U.S. PATENT DOCUMENTS

2008/0038236 A1 2/2008 Gimble et al.

OTHER PUBLICATIONS

Asakura, et al., Encyclopedia of Agricultural Science, Arntzen, C. J., Ritter, E. M. Eds.; Academic Press: New York, NY, 4:1-11 (1994).
Chen J, et al., J. Biomed. Mater. Res. A., 79(2):307-317 (2006).
Freddi G, et al., J Biotechnol, 125(2):281-94 (2006).
Goissis G, et al., Artif. Organs, 27(5):437-443 (2003).
Gotoh K, et al., Biosci. Biotechnol. Biochem., 64(8):1664-1670 (2000).
Gotoh Y, et al., Bioconjug. Chem., 4(6):554-559 (1993).
Gotoh Y, et al., Biomaterials, 18(3):267-271 (1997).
H.-J. Jin JP, et al, Advanced Functional Materials 15(8):1241-1247 (2005).
Hutmacher DW, Biomaterials, 21(24):2529-2543 (2000).
Kim HJ, et al., Macromol. Biosci., 7(5):643-655 (2007).
Lotz B, et al., Biochimie, 61(2):205-214 (1979).
Nakayama K, et al., Bioconjug. Chem., 16(6):1360-1366 (2005).
Pielak GJ, et al., Biochemistry, 23:589-596 (1984).
Sampaio S, et al., J. Biotechnol., 116(1):21-33 (2005).
Sofia S, et al., J. Biomed. Mater. Res., 54(1):139-148 (2001).
Tamada Y, Biomaterials, 25(3):377-383 (2004).
Vepari CP, et al., Biotechnol. Bioeng., 93(6):1130-1137 (2006).
Winkler S, et al., Biochemistry, 39(41):12739-12746 (2000).
Zhou CZ, et al., Proteins, 44(2):119-122 (2001).

*Primary Examiner* — Timothy J. Kugel
*Assistant Examiner* — Atnaf Admasu
(74) *Attorney, Agent, or Firm* — Nixon Peabody LLP

(57) ABSTRACT

A method for modifying silk polymer by coupling a chemical moiety to a tyrosine residue of a silk polymer is described herein for the purpose of altering the physical properties of the silk protein. Thus, silk proteins with desired physical properties can be produced by the methods described herein. These methods are particularly useful when the introduction of cells to a mammal is desired, since modifications to the silk protein affect the physical properties and thus the adhesion, metabolic activity and cell morphology of the desired cells. The silk protein can be modified to produce, or modify, a structure that provides an optimal environment for the desired cells.

37 Claims, 14 Drawing Sheets

| | Equivalents Added* | Absorbance (325 nm) | Estimated Azo ε | Azo Conc. (mM) | Silk Conc. (mM) | % Tyrosines Modified ** |
|---|---|---|---|---|---|---|
| A | 0.40 | 0.57 | 22000 | 2.6E-05 | 3.6E-07 | 26% |
| B | 0.25 | 0.39 | 22000 | 1.8E-05 | 3.6E-07 | 18% |
| C | 0.10 | 0.20 | 22000 | 9.1E-06 | 3.6E-07 | 9% |

FIG. 3C

| | Absorbance ($\lambda_{max}$) | Estimated Azo $\varepsilon$ | Azo Conc. (mM) | Silk Conc. (mM) | % Tyrosines Modified * |
|---|---|---|---|---|---|
| COOH Azosilk-1 | 0.57 | 22000 | 2.6E-05 | 3.6E-07 | 26% |
| Amino Azosilk-2 | 0.24 | 22000 | 1.1E-05 | 3.6E-07 | 1 % |
| Ketone Azosilk-3 | 0.60 | 22000 | 2.7E-05 | 3.6E-07 | 27% |
| Sulfo Azosilk-4 | 0.55 | 22000 | 2.5E-05 | 3.6E-07 | 25% |
| Heptyl Azosilk-5 | 0.18 | 22000 | 8.2E-06 | 3.6E-07 | 8% |

FIG. 4B

DAY FIVE

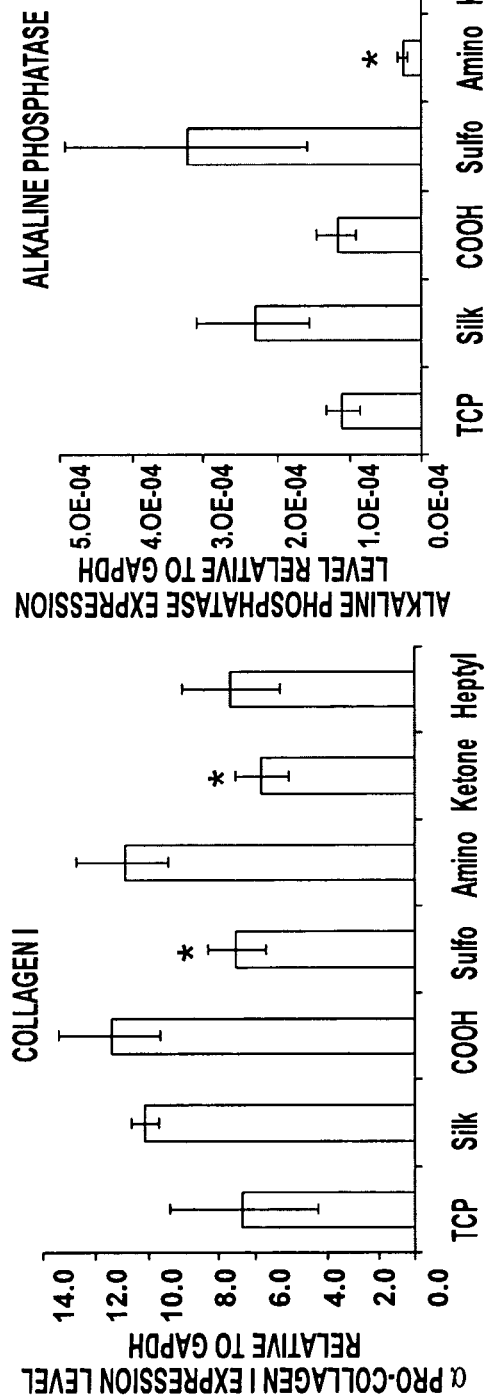

DIAZONIUM SALT MODIFICATION OF SILK POLYMER

CROSS REFERENCE

This application claims the benefit of priority as applicable under 35 U.S.C. 119(e) of U.S. Provisional Application Ser. Nos. 61/077,593 filed on Jul. 2, 2008 and 61/036,284 filed on Mar. 13, 2008, the contents for both of which are incorporated herein by reference.

GOVERNMENT FUNDING

This invention was made with Government support under The United States Air Force Office of Scientific Research—FA9550-07-1-0079; National Institutes of Health—NIH P41 EB002520; and National Institutes of Health and National Institute of Arthritis and Musculoskeletal and Skin Diseases—NIH F32 AR055029. The Government has certain rights in the invention.

FIELD OF THE INVENTION

The present invention relates to modified silk polymer.

BACKGROUND

A major goal of tissue repair and regeneration is to develop a biological alternative in vitro for producing an implantable structure that serves as a support and speeds regenerative growth in vivo within a defect area.

In recent years biodegradable polymers such as poly(glycolic acid), poly(L-lactic acid)(PLLA) and their copolymers poly(L-lactic-co-glycolic acid) (PLGA) have been used as scaffold materials in studies of tissue formation (Sofia S., Functionalized silk-based biomaterials for bone formation, J. Biomed. Mater. Res., 54(1):139-148 (2001)). Advantages of these polymers include their biocompatibility and degradability. However, PLGA can induce inflammation due to the acid degradation products that result during hydrolysis (Sofia, S., (2001)). There are also processing difficulties with polyesters that can lead to inconsistent hydrolysis rates and tissue response profiles. Thus, there is a need for polymeric materials that have more controllable features such as hydrophobicity, hydrophilicity, structure, and mechanical strength, while also being biocompatible and/or bioresorbable. Biological polymeric materials often demonstrate combinations of properties which are unable to be reproduced by synthetic polymeric materials. (Perez-Rigueiro et al. Science, 1998; 70: 2439-2447; Hutmacher D. Biomaterials 2000. 21, 2529-2543). For example, scaffolds for bone tissue regeneration require high mechanical strength and porosity along with biodegradability and biocompatibility.

Silk fibroin isolated from *Bombyx mori* silkworm cocoons has been employed as a matrix material in many tissue engineering applications (Altman G H, et al *Biomaterials* 2003; 24(3):401-16; Wang Y, et al. *Biomaterials* 2006; 27(36):6064-82; Kim H J, et al. *Macromol Biosci* 2007; 7(5): 643-55; Hofmann S, et al. *Biomaterials* 2007; 28(6):1152-62; Wang Y, et al *Biomaterials* 2006; 27(25):4434-42; Meinel L, *Bone* 2006; 39(4):922-31; Hofmann S, et al. *Tissue Eng* 2006; 12(10):2729-38; Altman G H, et al. *Biomaterials* 2002; 23(20):4131-41) due to its mechanical properties (Heslot H. *Biochimie* 1998; 80(1):19-31), biocompatibility (Meinel L, et al. *Biomaterials* 2005; 26(2):147-55), slow degradation profile (Horan R L, et al. In vitro degradation of silk fibroin. *Biomaterials* 2005; 26(17):3385-93), and aqueous processibility (Wang X, et al. *J Control Release* 2007; 117(3):360-70; Wang X, et al. *J Control Release* 2007; 121(3):190-9; Li C, et al. *Biomaterials* 2006; 27(16):3115-24; Karageorgiou V, et al. *J Biomed Mater Res A* 2006; 78(2):324-34; Wang X, et al. *Langmuir* 2005; 21(24):11335-41; Kim U J, et al. *Biomaterials* 2005; 26(15):2775-85; Nazarov R, et al. *Biomacromolecules* 2004; 5(3):718-26; Kim U J, et al. *Biomacromolecules* 2004; 5(3):786-92; Jin H J, et al. *Biomaterials* 2004; 25(6): 1039-47; Jin H J, et al. *Biomacromolecules* 2002; 3(6):1233-9). The mechanical properties of the silk fibroin protein can be attributed to the formation of an extended crystalline β-sheet structure that is composed of recurrent sequences of glycine, alanine and serine amino acids (Heslot, H., (1998); Lotz B, et al. *Biochimie* 1979; 61(2):205-14; Zhou C Z, et al. *Proteins* 2001; 44(2):119-22). The extent of β-sheet structure formation can be controlled through physical (Kim U J, et al. (2005); Valluzzi R, et al. *Philos Trans R Soc Lond B Biol Sci* 2002; 357(1418):165-7) or chemical methods (Winkler S, et al. *Biochemistry* 2000; 39(41):12739-46; Matsumoto A, et al. *J Phys Chem B* 2006; 110(43):21630-8; H.-J. Jin J P et al, 2005; 15(8):1241-1247), leading to materials with controlled crystallinity and degradation rate. In order to further enhance robust tissue formation in vitro using silk as a scaffolding material, tailoring the interaction between these scaffolds and human bone marrow-derived mesenchymal stem cells (hMSCs) is desirable. Adult hMSCs offer potential for regenerative therapies, as they are able to differentiate into bone (Kraus K H, Kirker-Head C. *Vet Surg* 2006; 35(3):232-42; Mauney J R, et al. *Tissue Eng* 2005; 11(5-6):787-802), cartilage (Djouad F, et al. *Regen Med* 2006; 1(4):529-37; Magne D, et al. *Trends Mol Med* 2005; 11(11):519-26), fat (Neumann K, et al. *J Cell Biochem* 2007; Mauney J R, et al. *Biomaterials* 2005; 26(31):6167-75), muscle (Pittenger M, et al. *J Musculoskelet Neuronal Interact* 2002; 2(4):309-20), and ligament (Vunjak-Novakovic G, et al. *Annu Rev Biomed Eng* 2004; 6:131-56) cell lines.

SUMMARY OF THE INVENTION

Disclosed herein are methods for modifying a silk protein for the purpose of tailoring physical properties of the silk for a desired application, for example a scaffold for human mesenchymal stem cells. More specifically, a chemical moiety is attached to a tyrosine residue of the silk protein by diazonium coupling chemistry, which can alter the hydrophobicity, or conversely the hydrophilicity of the silk protein. Modified silks can be used in a variety of ways, which are known to those skilled in the art. It is preferred that the modified silk proteins disclosed herein are used to modify an implantable structure (e.g., a medical device) or a tissue culture platform, such that the silk is flexibly tailored for the desired application. For example, a modified silk can be used for culturing cells or as a bioimplantable scaffold. The biological applications of modified silks is vast and include, for example structural supports for bone and tissue regeneration and/or drug delivery.

In one aspect a method for producing a modified silk composition is described, which comprises the steps of contacting a diazonium salt with a silk polymer solution to form a modified silk mixture, and then transforming the modified silk mixture into an insoluble state to form a modified silk composition. Alternatively, a modified silk composition comprises the steps of transforming a silk polymer solution into an insoluble state, and contacting the insoluble silk polymer with a diazonium salt to form a modified silk composition.

In one embodiment of this aspect and all other aspects disclosed herein, the silk polymer and diazonium salt are mixed to form a substantially homogeneous mixture.

In another embodiment of this aspect and all other aspects disclosed herein, silk polymer contains at least one tyrosine residue and the diazonium salt contains at least one chemical moiety.

In another embodiment of this aspect and all other aspects disclosed herein, contacting involves reacting at least one of the chemical moieties of the diazonium salt with the tyrosine residue of the silk polymer.

In another embodiment of this aspect and all other aspects disclosed herein, a chemical moiety is selected from the group consisting of a sulfonic acid group, a carboxylic acid group, an amine group, a ketone group, an alkyl group, an alkoxy group, a thiol group, a disulfide group, a nitro group, an aromatic group, an ester group, an amide group and a hydroxyl group. In another embodiment of this aspect and all other aspects described herein, a chemical moiety is attached to a tyrosine residue of the silk polymer.

In another embodiment of this aspect and all other aspects disclosed herein, the modified insoluble silk polymer is hydrophilic and in another embodiment the modified silk polymer is hydrophobic.

In another embodiment of this aspect and all other aspects disclosed herein, the silk polymer further comprises a bioactive agent. In another embodiment of this aspect and all other aspects disclosed herein, the bioactive agent comprises small molecules, protein, peptides or nucleic acids.

In another embodiment of this aspect and all other aspects disclosed herein, the bioactive agent is bonded to the chemical moiety of the modified silk protein.

In another embodiment of this aspect and all other aspects disclosed herein, the silk polymer further comprises a mineral. In another embodiment of this aspect and all other aspects disclosed herein, the mineral is contacted with the silk polymer prior to contact with the diazonium salt or alternatively, the minerals are contacted with the silk polymer after contact with the diazonium salt. In some embodiments, the mineral is biocompatible with bone or cartilage.

In another embodiment of this aspect and all other aspects disclosed herein, the silk polymer further comprises cells.

In another embodiment of this aspect and all other aspects disclosed herein, the cell is selected from the group consisting of a stem cell, a primary cell and a cell line.

In another embodiment, the stem cells are induced to differentiate, while in alternative embodiment the stem cells are maintained in an undifferentiated state.

In another aspect, the method for modifying silk comprises the steps of forming the silk into an insoluble state, and contacting a diazonium salt with the insoluble silk.

In another aspect a method for modifying a surface is described, which comprises the steps of (a) contacting a diazonium salt with a silk fibroin solution to form a modified silk mixture, (b) coating a surface with the modified silk mixture, and (c) transforming the modified silk mixture into an insoluble state.

In one embodiment of this aspect and all other aspects disclosed herein, the surface comprises an implantable structure. Alternatively, the surface comprises a tissue culture platform.

Another aspect disclosed herein is a composition of modified silk, the composition comprising silk polymer that has been modified by (a) a reaction with a diazonium salt having at least one chemical moiety, and (b) a transformation into the insoluble state.

In one embodiment the composition further comprises a bioactive agent.

In another embodiment the composition of modified silk comprises a chemical moiety selected from the group consisting of a sulfonic acid group, a carboxylic acid group, an amine group, a ketone group, an alkyl group, an alkoxy group, a thiol group, a disulfide group, a nitro group, an aromatic group, an ester group, an amide group and a hydroxyl group.

In another embodiment of this aspect and all other aspects described herein, the silk polymer contains at least one tyrosine residue.

In another embodiment of this aspect and all other aspects described herein, the chemical moiety is bonded to the tyrosine residue.

In another embodiment of this aspect, the modified silk composition is formed into an insoluble state.

In another embodiment, the insoluble silk polymer is hydrophilic. Alternatively, the insoluble silk polymer is hydrophobic.

In another embodiment of this aspect, the bioactive agent comprises small molecules, proteins, polypeptides, or nucleic acids. In another embodiment, the bioactive agents are bonded to the chemical moiety of a modified silk.

In one embodiment the silk polymer further comprises a mineral. In an alternative embodiment, the mineral is biocompatible with bone or cartilage.

In another embodiment, the silk polymer further comprises cells, which are selected from the group consisting of a stem cell, a primary cell and a cell line. In another embodiment the stem cells are induced to differentiate. Alternatively, the stem cell is maintained in an undifferentiated state.

In another embodiment of this aspect and all other aspects disclosed herein, the modified silk composition is in a form useful for an optics application.

Also disclosed herein is a kit for modifying silk protein, which comprises silk polymer, diazonium salt, and packaging materials therefor.

Definitions

As used herein, the term "silk polymer" or "silk fibroin" includes silkworm fibroin and insect or spider silk protein (Lucas et al., Adv. Protein Chem 13: 107-242 (1958). Preferably, fibroin is obtained from a solution containing a dissolved silkworm silk or spider silk. Generally, silk polymer of silk fibroin has been treated to substantially remove sericin. The silkworm silk protein is obtained, for example, from *Bombyx mori*, and the spider silk is obtained, for example, from *Nephila clavipes*. In the alternative, silk proteins suitable for use in the present invention can be obtained from a solution containing a genetically engineered silk, such as from bacteria, yeast, mammalian cells, transgenic animals or transgenic plants. See, for example, WO 97/08315 and U.S. Pat. No. 5,245,012.

As used herein, the term "modified silk" or "modified silk composition" refers to a silk polymer following contact with a diazonium salt. A silk polymer as described herein, is "modified" by a diazonium coupling reaction, wherein a desired chemical moiety is bonded to a tyrosine residue in the silk polymer. A "chemical moiety" is a chemical side group that can be used to change the physical properties of a molecule, for example hydrophobicity, hydrophilicity, or gelation time. Some non-limiting examples of chemical moieties include a sulfonic acid group, a carboxylic acid group, an amine group, a ketone group, an alkyl group, an alkoxy group, a thiol group, a disulfide group, a nitro group, an aromatic group, an ester group, an amide group or a hydroxyl group. In some embodiments, the chemical moiety of a modified silk may also bind another moiety, for example a bioactive agent such as a drug, or a protein, wherein the chemical moiety has an additional function as a linker as well as the effect of the chemical moiety on the physical properties of a silk protein.

As used herein, the term "diazonium salt" refers to a group of organic compounds with a structure of R—$N_2^+X^-$, wherein R can be any organic residue (e.g., alkyl or aryl) and X is an inorganic or organic anion (e.g., halogen). A diazonium salt can be formed by the treatment of aromatic amines (e.g., aniline) with sodium nitrite in the presence of a mineral acid and methods for synthesizing diazonium salts are known to those of skill in the art. See for example WO 2006/014549, WO 2004/108633 and WO 2001/025341, which are incorporated herein by reference.

As used herein the term "insoluble state" refers to the formation of, or state of being in, a substantially amorphous, primarily β-sheet conformation. The term 'transformed into an insoluble state' is not intended to reflect polymerization of silk monomers into a silk polymer. Rather, it is intended to reflect the conversion of soluble silk polymer to a water insoluble state. As used herein silk polymer is in an 'insoluble state' if it can be pelleted by centrifugation or if it cannot be dissolved by immersion in, or rinsing with, water at 37° C. or less.

As used herein, the term "surface" is used to describe the portion of any structure that can be modified by forming silk into an insoluble state on the exterior or interior portion of the structure. The surface can be made of any material, wherein the material is non-toxic to cells and is therefore capable of sustaining cell viability under appropriate culture conditions for the cell.

As used herein, the term "implantable structure" is generally any structure that upon implantation does not generate an immune response in the host organism. Thus, an implantable structure should not for example, be or contain an irritant, or contain LPS etc. The term "implantable structure" can be used to describe a medical device made to replace or act as a missing biological structure. In this context implants may be placed within the body (internal) or placed outside the body (external). An implantable structure can also be a drug delivery device such as a hydrogel or a subcutaneous implant that for example, can allow sustained or long-term delivery of an agent.

As used herein, the term "tissue culture platform" is used to describe any surface on which an adherent mammalian cell can attach to and/or maintain cell viability. The "tissue culture platform" can include culture dishes, plates, wells, slides, discs and coverslips, among others. The "tissue culture platform" can also be an engineered scaffold of desired shape/size.

As used herein, the term "induced to differentiate" refers to a chemical/biological treatment, a physical environment or a genetic modification that is conducive to the formation of terminally differentiated cells (e.g., cardiomyocytes or neurons) from pluripotent or multipotent stem cells (e.g., mesenchymal stem cells). Differentiation can be assessed by the appearance of distinct cell-type specific markers or by the loss of stem cell specific markers. The term "pluripotent" is used to denote cells that are capable of forming terminally differentiated cells of all lineages, whereas the term "multipotent" is used to denote cells that are capable of forming terminally differentiated cells of a particular lineage, for example hematopoetic cells.

As used herein, the term "form useful for an optics application" is used to describe the modified silks formed into optical devices such as, for example diffraction gratings, pattern generators, and lenses. Various optical applications for use with the modified silks described herein are contemplated.

BRIEF DESCRIPTION OF THE FIGURES

FIG. 10. is a series of graphs that illustrate the use of RT-PCR to measure expression levels of exemplary differentiation markers in a culture of cells.

Figure 1:
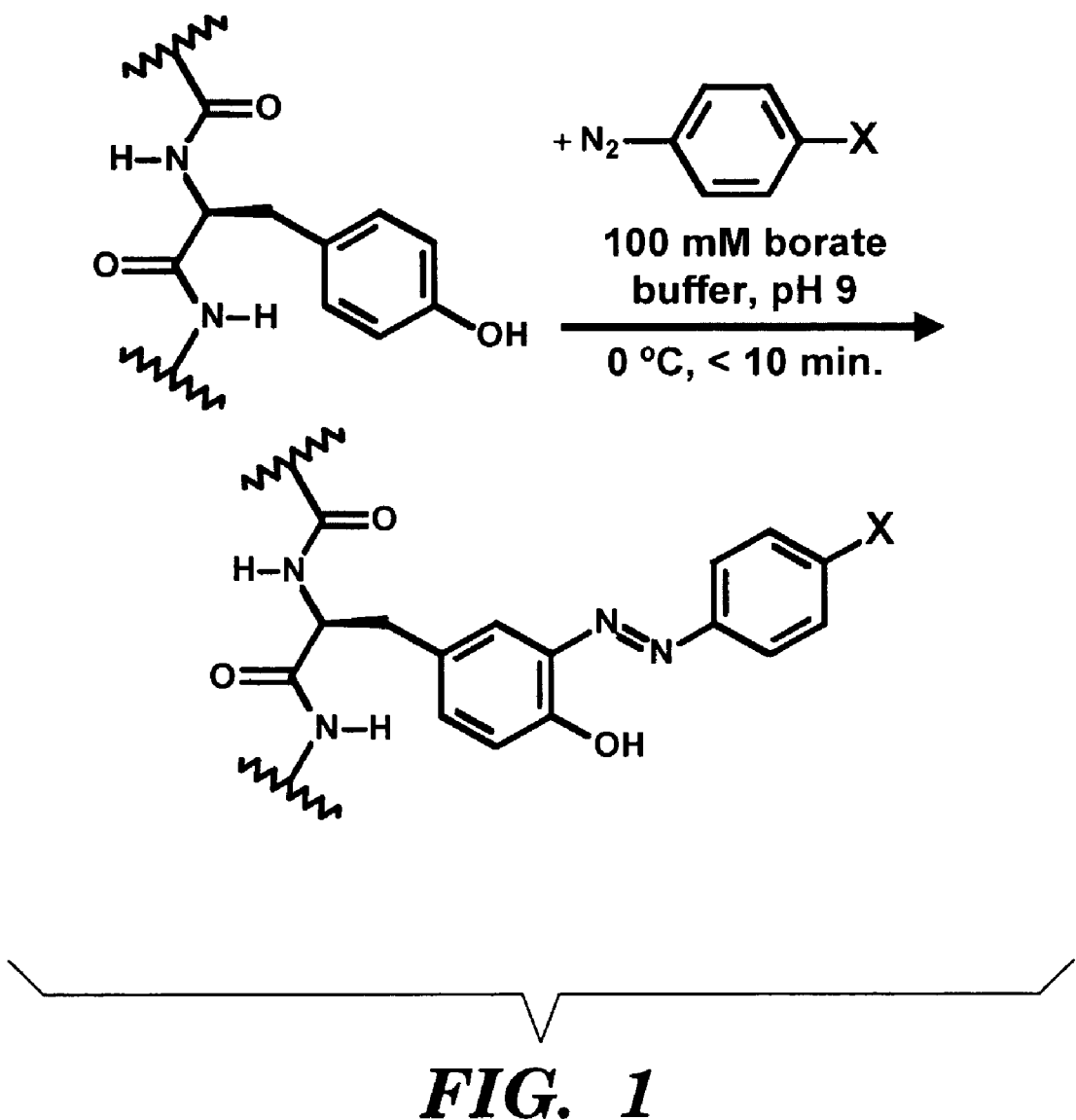
FIG. 1. shows a schematic depiction of a diazonium coupling reaction in silk.

Table 1. shows the contact angle of water on representative modified silks.

DETAILED DESCRIPTION OF THE INVENTION

A simple chemical modification method using diazonium coupling chemistry was developed to tailor the structure and hydrophilicity of silk fibroin protein and is disclosed herein. The methods disclosed herein can be used to install small molecules with various functional groups including sulfonic and carboxylic acids, amines, ketones and alkanes, among others, for the purpose of tailoring the physical properties of a silk polymer. Thus, a diazonium salt with a pre-selected side chain can be used to form a silk polymer with desired physical properties such as for example, altered hydrophilicity/hydrophobicity or gelation time.

Isolation of Silk Polymer

Silk is a well described natural fiber produced by the silkworm, *Bombyx mori*, which has been used traditionally in the form of threads in textiles for thousands of years. This silk contains a fibrous protein termed fibroin (both heavy and light chains) that forms the thread core, and glue-like proteins termed sericin that surround the fibroin fibers to cement them together. The fibroin is a highly insoluble protein containing up to 90% of the amino acids glycine, alanine and serine leading to β-pleated sheet formation in the fibers (Asakura, et al., Encyclopedia of Agricultural Science, Arntzen, C. J., Ritter, E. M. Eds.; Academic Press: New York, N.Y., 1994; Vol. 4, pp 1-11).

Silk provides an important set of material options for biomaterials and tissue engineering because of the impressive mechanical properties, biocompatibility and biodegradability (Altman, G. H., et al., Biomaterials 2003, 24, 401-416; Cappello, J., et al., J. Control. Release 1998, 53, 105-117; Foo, C. W. P., et al., Adv. Drug Deliver. Rev. 2002, 54, 1131-1143;

Dinerman, A. A., et al., J. Control. Release 2002, 82, 277-287; Megeed, Z., et al., Adv. Drug Deliver. Rev. 2002, 54, 1075-1091; Petrini, P., et al., J. Mater. Sci-Mater. M. 2001, 12, 849-853; Altman, G. H., et al., Biomaterials 2002, 23, 4131-4141; Panilaitis, B., et al., Biomaterials 2003, 24, 3079-3085). The unique mechanical properties of reprocessed silk such as fibroin and its biocompatibility make the silk fibers especially attractive for use in biotechnological materials and medical applications. For example, 3-dimensional porous silk scaffolds have been described for use in tissue engineering (Meinel et al., Ann Biomed Eng. January 2004; 32(1): 112-22; Nazarov, R., et al., Biomacromolecules in press). Further, regenerated silk fibroin films have been explored as oxygen- and drug-permeable membranes, supports for enzyme immobilization, and substrates for cell culture (Minoura, N., et al., Polymer 1990, 31, 265-269; Chen, J., et al., Minoura, N., Tanioka, A. 1994, 35, 2853-2856; Tsukada, M., et al., Polym. Sci. Part B Polym. Physics 1994, 32, 961-968). In addition, silk hydrogels have found numerous applications in tissue engineering, as well as in drug delivery (Megeed et al., Pharm Res. July 2002; 19(7):954-9; Dinerman et al., J Control Release. Aug. 21, 2002; 82(2-3):277-87).

A method for modifying silk polymer by coupling a chemical moiety to a tyrosine residue of a silk polymer is described herein for the purpose of altering the physical properties of the silk protein. Thus, silk proteins with desired physical properties can be produced by the methods described herein. These methods are particularly useful when the introduction of cells to a mammal is desired, since modifications to the silk protein affect the physical properties and thus the adhesion, metabolic activity and cell morphology of the desired cells. The silk protein can be modified to produce, or coat, a structure, which provides an optimal environment for the culture or delivery of desired cells. One embodiment of this method is outlined in Example 1.

All-Aqueous Isolation of Silk Polymer

In some cases it can be advantageous to avoid the use of organic solvents in the isolation of silk polymer, for example when the silk polymer is to be combined with living cells. Such solvents can pose biocompatibility problems when the processed materials are exposed to cells in vitro, or in vivo. Further, where it is desired to include a bioactive agent e.g., a growth factor or other bioactive molecule in a structure to be implanted, it can be advantageous to use an all-aqueous approach in order to maintain the activity of the agent.

Organic solvents can also change the properties of fibroin material. For example, the immersion of silk fibroin films in organic solvents such as methanol causes dehydration of the hydrated or swollen structure, leading to crystallization and thus, loss of solubility in water. Further, with respect to tissue engineering scaffolds, the use of organic solvents can render the silk material to be less degradable.

An all-aqueous approach for preparing silk to be used is described, for example, in U.S. 20070187862, which is incorporated herein by reference.

Diazonium Salts

Diazonium salts useful for the methods and compositions described herein, are known to those of skill in the art. A diazonium salt comprises a group of organic compounds with a structure of $R-N_2^+X^-$, wherein R can be any organic residue (e.g., alkyl or aryl) and X is an inorganic or organic anion (e.g., halogen). A diazonium salt can be formed by the treatment of aromatic amines (e.g., aniline) with sodium nitrite in the presence of a mineral acid and methods for synthesizing diazonium salts are known to those of skill in the art. See for example WO 2006/014549, WO 2004/108633 and WO 2001/025341, which are incorporated herein by reference. The methods for synthesizing diazonium salts and the chemistries involved in diazonium coupling are well within the ability of one skilled in the art for use with the methods described herein. Diazonium salts for use herein comprise at least one chemical moiety, however it is also contemplated that a diazonium salt comprises multiple chemical moieties.

Chemical Modification of Residues

The physical properties and surface chemistry of the silk protein can be modified by bonding a chemical moiety to a tyrosine residue in the silk protein and is particularly useful for synthesizing a structure or surface designed for attaching or growing cells. Biomaterial surface chemistry is known to influence a variety of cell responses ranging from changes in surface adhesion (Sofia S, McCarthy M B, Gronowicz G, Kaplan D L. *J Biomed Mater Res* 2001; 54(1):139-48; Kim H J, Kim U J, Vunjak-Novakovic G, Min B H, Kaplan D L. *Biomaterials* 2005; 26(21):4442-52; Uebersax L, Hagenmuller H, Hofmann S, Gruenblatt E, Muller R, Vunjak-Novakovic G, et al. *Tissue Eng* 2006; 12(12):3417-29) to activation of biochemical pathways regulating cellular proliferation, differentiation, and survival (Sofia, S. et al (2001); Kim, H J, et al (2005)1 Uebersax, L, et al (2006); Keselowsky B G, Collard D M, Garcia A J. *Proc Natl Acad Sci USA* 2005; 102(17):5953-7). For example, surface hydrophilicity can affect cell adherence and proliferation (Kim M S, Shin Y N, Cho M H, Kim S H, Kim S K, Cho Y H, et al. *Tissue Eng* 2007; 13(8):2095-103; Grinnell F. *Int Rev Cytol* 1978; 53:65-144) and regulate expression of specific cell surface integrins (Keselowsky, B G, et al (2005); Garcia A J, Boettiger D. *Biomaterials* 1999; 20(23-24):2427-33; Garcia A J, Gallant N D. *Cell Biochem Biophys* 2003; 39(1):61-73; Garcia A J. *Biomaterials* 2005; 26(36):7525-9; Hubbell J A. *Biotechnology* (NY) 1995; 13(6):565-76; Lim J Y, Taylor A F, Li Z, Vogler E A, Donahue H J. *Tissue Eng* 2005; 11(1-2):19-29; Keselowsky B G, Collard D M, Garcia A J. *Biomaterials* 2004; 25(28):5947-54; Grinnell F, Milam M, Srere P A. *Arch Biochem Biophys* 1972; 153(1):193-8). Substrate surface chemistry has also been shown to affect cell differentiation directly (Keselowsky B G, (2005); Lim J Y, et al (2005); Keselowsky B G, et al (2004); Liu X, Lim J Y, Donahue H J, Dhurjati R, Mastro A M, Vogler E A. *Biomaterials* 2007; 28(31):4535-50; Curran J M, Chen R, Hunt J A. *Biomaterials* 2006; 27(27):4783-93, Curran J M, Chen R, Hunt J A. *Biomaterials* 2005; 26(34):7057-67) or by modulating the adsorption of extracellular matrix proteins such as fibronectin, vitronectin and laminin to the substrate (Keselowsky, B G., et al (2005), Keselowsky, B G., et al (2004); Keselowsky B G, Collard D M, Garcia A J. *J Biomed Mater Res A* 2003; 66(2):247-59). These matrix proteins can selectively engage cell surface integrins that are critical for differentiation (Takeuchi Y, Suzawa M, Kikuchi T, Nishida E, Fujita T, Matsumoto T. *J Biol Chem* 1997; 272(46):29309-16; Xiao G, Wang D, Benson M D, Karsenty G, Franceschi R T. *J Biol Chem* 1998; 273(49):32988-94; Keselowsky B G, Wang L, Schwartz Z, Garcia A J, Boyan B D. *J Biomed Mater Res A* 2007; 80(3):700-10; Kundu A K, Putnam A J. *Biochem Biophys Res Commun* 2006; 347(1):347-57). The ability to modify the surface chemistry of a biomaterial can also aid in construction of a synthetic tissue with physical properties similar to that of native tissue (Hutmacher D W. *Biomaterials* 2000; 21(24):2529-43). For bone tissue engineering, modification of biomaterial scaffolds with charged groups (such as carboxylic acids) that are conducive to mineralization can facilitate pre-mineralization of the scaffold with hydroxyapatite (Chen J, Chu B, Hsiao B S. *J Biomed Mater Res A* 2006; 79(2):307-17; Goissis G, da Silva Maginador S V, da Conceicao Amaro Martins V. *Artif Organs* 2003; 27(5):437-43; Song J, Malathong V, Bertozzi C R. *J Am Chem Soc* 2005; 127(10): 3366-72), and promote differentiation of cells into an osteogenic lineage (Matsumoto A, et al. (2006); LeGeros R Z. *Clin Orthop Relat Res* 2002(395):81-98; Bosnakovski D, Mizuno M, Kim G, Takagi S, Okumura M, Fujinaga T. *Biotechnol Bioeng* 2006; 93(6):1152-63; Mauney J R, Blumberg J, Pirun M, Volloch V, Vunjak-Novakovic G, Kaplan D L. *Tissue Eng* 2004; 10(1-2):81-92; Phillips J E, Hutmacher D W, Guldberg R E, Garcia A J. *Biomaterials* 2006; 27(32):5535-45; Lu H H, El-Amin S F, Scott K D, Laurencin C T. *J Biomed Mater Res A* 2003; 64(3):465-74). Likewise, increasing the hydrophilicity of the biomaterial surface (Lee S J, Khang G, Lee Y M, Lee H B. *J Biomater Sci Polym Ed* 2002; 13(2):197-212; Park G E, Pattison M A, Park K, Webster T J. *Biomaterials* 2005; 26(16):3075-82; Miot S, Woodfield T, Daniels A U, Suetterlin R, Peterschmitt I, Heberer M, et al. *Biomaterials* 2005; 26(15):2479-89; Yoo H S, Lee E A, Yoon J J, Park T G. *Biomaterials* 2005; 26(14):1925-33) or incorporating sulfated polymers (Chen Y L, Lee H P, Chan H Y, Sung L Y, Chen H C, Hu Y C. *Biomaterials* 2007; 28(14):2294-305; van Susante J L C, Pieper J, Buma P, van Kuppevelt T H, van Beuningen H, van Der Kraan P M, et al. *Biomaterials* 2001; 22(17): 2359-69) can increase chondrocyte differentiation and cartilage tissue formation.

The most commonly used chemical modification method for silk is derivatization of the carboxylic acid residues through carbodiimide coupling with primary amines (Sofia, S. et al (2001); Vepari C P, Kaplan D L. *Biotechnol Bioeng* 2006; 93(6):1130-7). However, only ~1 mol % of the total amino acid content of the silk fibroin protein is composed of aspartic and glutamic acid residues, thereby limiting the extent of functionalization (Zhou, C Z., et al (2001). Reactions targeting tyrosine residues in silk have the potential to triple the amount of functional group incorporation over carbodiimide coupling methods, as ~5 mol % of the amino acids in silk are tyrosines (Heslot, H. (1998); Zhou, C Z., et al (2001)). In addition, the tyrosine residues are distributed throughout the protein sequence, allowing a homogeneous distribution of modifications along the scaffold protein (Zhou, C Z., et al (2001)). A few strategies to modify the tyrosines in silk have been reported in the literature involving cyanuric chloride-activated coupling (Gotoh Y, Tsukada M, Minoura N. *Bioconjug. Chem* 1993; 4(6):554-9; Gotoh Y, Tsukada M, Minoura N, Imai Y. *Biomaterials* 1997; 18(3): 267-71), enzyme catalyzed reactions with tyrosinase (Sampaio S, Taddei P, Monti P, Buchert J, Freddi G. *J Biotechnol* 2005; 116(1):21-33; Freddi G, Anghileri A, Sampaio S, Buchert J, Monti P, Taddei P. *J Biotechnol* 2006; 125(2):281-94), or sulfation of the tyrosine residues with chlorosulfonic acid (Gotoh K, Izumi H, Kanamoto T, Tamada Y, Nakashima H. *Biosci Biotechnol Biochem* 2000; 64(8):1664-70; Tamada Y. *Biomaterials* 2004; 25(3):377-83). However, these methods are limited in the variety of molecules that can be incorporated.

The methods and compositions described herein, involve modification of silk tyrosine residues by a diazonium coupling reaction, wherein the tyrosine residues are functionalized by the addition of a side group. Functionalization of silk polymer can affect physical properties of a silk polymer including, but not limited to, hydrophobicity, hydrophilicity or time required for spontaneous gelation to occur. Some examples of side groups used herein include, but are not limited to, sulfonic acid, carboxylic acid, amine, ketone or heptyloxy side groups. The extent of modification using several aniline derivatives can be characterized using UV/vis and $^1$H-NMR spectroscopy, and analysis of the resulting protein structure with ATR-FTIR spectroscopy. Introduction of hydrophobic functional groups can facilitate rapid conversion of the protein from a random coil to a β-sheet structure, while introduction of hydrophilic groups can inhibit this process. An example method for determining the extent of silk modification is described in the Examples section herein.

To summarize, multifunctional materials that can 1) directly interact with hMSCs in a specific manner in order to induce differentiation towards a particular cell lineage, or 2) provide an environment that is conducive to cell differentiation and tissue formation are contemplated herein. As discussed above, silk has demonstrated utility as a cell scaffold for tissue engineering. The methods described herein allow the surface chemistry of silk to be tailored in order to enhance formation of specific tissue types.

Formation of Modified Silk Polymer into an Insoluble State

When dissolved in aqueous solutions, silk is known to spontaneously assemble into a β-sheet structure at a relatively slow rate. The physical crosslinks formed by intermolecular β-sheet crystallization result in hydrogel formation. Depending on the protein concentration, this assembly can take weeks to occur but is catalyzed by lowering the pH or increasing the salt concentration (Kim, U J., et al (2004); Matsumoto, A. et al (2006). The transition from a random coil to a β-sheet structure can also be induced by the addition of organic solvents such as methanol to solid silk films or scaffolds.

Immersion in an alcohol or other suitable agent can produce an insoluble, amorphous composition comprising primarily silk polymer as a β-sheet structure (Sofia et al. Journal of Biomedical materials research 2001, 54, 139-148). Therefore, silk structures are soaked in a β-sheet structure inducing agent, such as alcohol, to induce the phase transition to β-sheet structure. The type of a β-sheet structure inducing agent can be selected to generate structures with different properties. For example, when methanol and propanol are used to induce β-sheet formation, the resulting structures are stronger but more brittle and therefore suitable in bone regeneration. Various methods of silk insolubilization including insolubilization that does not rely upon organic solvents or alcohol are contemplated herein and can be adapted based on the characteristics required for the modified silk described herein. U.S. 20070187862 describes an all-aqueous approach to the preparation of insoluble silk structures from solubilized silk fibroin.

Minerals

The methods described herein are suitable for tissue regeneration or structural support of, for example bone and teeth, among others. A mineral component can be added to a scaffold, a structure or a surface made from modified silks described herein, for example in order to improve biocompatibility or to enhance tissue regeneration while providing a support for injured or diseased tissue.

Minerals for use in the methods described herein, can include any biocompatible mineral that one desires to use. In one particular embodiment, minerals are chosen that are similar to the minerals found in bone or are important for bone growth/regeneration. A preferred mineral is hydroxyapatite, which has well-known characteristics with respect to its compatibility with bone. Indeed, almost 70% of bone is comprised of hydroxyapatite. Hydroxyapatite particles of varying size can be used to synthesize an implantable structure using the methods disclosed herein, and are available in nanocrystal, powder, granules and blocks from commercial sources such as Berkeley Advanced Biomaterials. Other minerals including silica, calcium, phosphate, or potassium, among others are contemplated for use herein.

Minerals can be added to the silk protein at any point during the diazonium chemistry process, provided that the mineral does not interfere with modification of the silk protein, or the diazonium chemistry does not alter the intended function of the mineral. Thus, the minerals can be added to the silk prior to attaching a chemical moiety or after attaching a chemical moiety. In addition, the minerals can be mixed into the silk protein prior to forming the silk into an insoluble state or can be sprayed onto the surface of an insoluble silk. Those skilled in the art can determine the method best suited for the application of the methods disclosed herein for the desired purpose of the modified silk.

Determining Hydrophilicity or Hydrophobicity

In some instances it is desired to tailor the physical properties of a silk protein for an intended purpose, for example culturing cells. For example, changes in hydrophobicity and hydrophilicity of a silk protein are contemplated herein as a result of silk protein modification. The modified silk can be tested for the desired hydrophobicity by the following method.

Hydrophilicity (or hydrophobicity) can be measured by determining the contact angle of a liquid on a hydrophilic (or hydrophobic surface). The water contact angle is determined by measuring the angle between a sloping edge of a water droplet and the surface it rests on. Typically, very hydrophobic surfaces will increase the contact angle of water, since water is very hydrophilic and the surface tension of water is increased. Conversely, very hydrophilic surfaces will decrease the contact angle of water, allowing it to spread out along the surface. Thus, the higher the contact angle of water, the more hydrophobic a surface is. The modified silks disclosed herein can be measured using the silk as a surface with unknown hydrophobic or hydrophilic properties. In this manner, the hydrophobic properties of the silk can be estimated by changes in the contact angle of a water droplet on the modified silk surface.

In order to measure the hydrophilicity of a modified silk polymer, a film is produced by casting a modified silk polymer onto a flat surface, followed by insolubilization of the silk, such that a surface of modified silk polymer is formed. A water droplet is placed onto the silk film after the formation of a modified silk into an insoluble state on a flat surface. The water contact angle is measured and then compared to that for an unmodified silk polymer film produced in a similar manner or is estimated based on the known physical properties of water on a variety of surfaces with variable hydrophobicity. One embodiment of the water contact method is described in Example 3, herein.

Surfaces for Modified Silk Polymer

In some cases it is useful to alter the properties of a surface by coating it with a modified silk protein, such that the surface has desired physical properties. A surface can be any structure or portion of a structure that can be coated with a modified silk polymer, prior to the formation of silk into an insoluble state. A surface can be composed of, for example, plastic, glass, ceramic or metal. It is preferred that a surface can withstand sterilization techniques such as autoclaving or UV radiation, especially in embodiments where the surface comprises an implantable structure or a tissue culture platform.

In some cases, the surface comprises an implantable structure such as a medical implant, for example an engineered support for bone. Thus, the surface of the implant to be coated should be compatible with the tissue domain into which it is to be implanted. Some non-limiting examples of implants that can be employed with the methods described herein include drug delivery devices, stents, prostheses, dental implants, heart valves, skin grafts, cosmetic implants, pacemakers, and infusion pumps.

In a preferred embodiment, the surface comprises a tissue culture platform including but not limited to wells, dishes, plates, discs, coverslips and slides. In this embodiment, the tissue culture surface is coated with a modified silk polymer and then the silk polymer is formed into an insoluble state, wherein the silk polymer coats a desired portion of the surface. In another embodiment, a modified silk polymer may be coated onto or into an engineered scaffold of desired shape, for example for ex vivo growth of organs. In this example cells can be seeded onto or into the scaffold and once the appropriate cell density is achieved, the cells can be induced to differentiate. This approach has wide-ranging capabilities for example, in the design or replacement organs and can be varied for the specific needs of one skilled in the art. Tailor made silk platforms can provide a surface amenable to the properties required to efficiently culture a wide range of cell types.

In addition, the modified silk can be formed into an insoluble state, such that the silk itself is the surface, for example for cell culture. Thus the surface can be comprised of a silk that is formed into an insoluble state in a mould, which is then removed such that the modified silk retains the 3-dimensional structure of the mould. Modified silks used in this manner are also contemplated herein.

Implantable Structures

An "implantable structure" is generally any structure that upon implantation does not generate an immune response in a host organism. Thus, an implantable structure should not for example, be or contain an irritant, or contain LPS etc. In addition, in some instances, it is preferred that an implantable structure does not prohibit cell infiltration, blood vessel growth or other properties that would inhibit bioresorption or integration of the structure into tissue. For such instances, for example, it is important that the structure is not simply a solid 3-dimensional form but comprises or develops some porosity such that cells, etc., can gain access during the resorption process (that is, unless the lack of bioresorption is desired). While it is generally preferred that an implantable structure does not raise or provoke an immune response (e.g., inflammation or the raising of antibodies against a component of an implant), in some cases it can be beneficial for the structure to induce an immune-response (e.g., generation of antibodies against a specific antigen) or to prevent integration into tissue. Such aspects are also contemplated within the methods described herein.

An implantable structure can be applied to a wide variety of uses, however it is preferred that an implantable structure, as described herein, is implanted for the repair or support of bone or tooth structures. Implantable silk structures can be used e.g., to give temporary support for teeth, for broken bones, for fragile/weak bones, or to speed healing of bone fractures, breaks, loss of calcification, etc. Modified silk coated structures as described herein can also be used to deliver a bioactive agent, either as a primary use or secondary to repair or support of a tissue. Bioactive agents useful in such embodiments are described herein below.

In general, the length of a tissue regenerative growth period will depend on the particular tissue being implanted with a silk structure. The growth period can be continued until the new tissue has attained desired properties, e.g., until the regenerating tissue has reached a particular thickness, size, strength, composition of proteinaceous components, and/or a particular cell density. Methods for assessing these parameters are known to those skilled in the art. The implantable structure should reabsorb at a rate that does not exceed the growth period of the tissue. Thus, the structure should remain substantially intact until sufficient infiltration of surrounding tissue occurs (as detected by methods known in the art) and the implantable structure is no longer necessary for tissue strength or structure (e.g., bone density). Such agents can provide prophylactic or therapeutic benefit either in situ, e.g., through promotion of desired biological processes, or, e.g., by leaching out of the structure after implantation.

Bioactive Agents

In some cases it is preferable to incorporate a bioactive agent into a modified silk polymer. A bioactive agent can be incorporated into or onto a modified silk coating of a medical implant, for example to encourage local tissue growth, prevent infection, or promote angiogenesis. A bioactive agent can be incorporated onto or into a modified silk coating of a tissue culture platform for example, to enhance cell growth, to speed cell division, to prevent bacterial infiltration of mammalian cells, to maintain an undifferentiated state or to induce cells to differentiate into a desired lineage.

In one preferred embodiment, additives such as pharmaceutical/therapeutic agents, or biologically active agents, are incorporated into a modified silk polymer. For example, growth factors, pharmaceuticals, or biological components can be incorporated into the polymer prior to, or following formation of silk into an insoluble state. Any pharmaceutical carrier can be used that does not dissolve or otherwise interfere with the solidified modified silk. The bioactive or therapeutic agents can be added to the modified silk as a liquid, a finely divided solid, or any other appropriate physical form. Alternatively, a bioactive agent can be added to a pre-formed insoluble modified silk polymer as described herein by immersing the insoluble silk polymer in a solution comprising a bioactive agent. That is, the agent need not necessarily be present when the modified silk is formed into an insoluble state. The bioactive agent can also be chemically bonded to the silk using a chemical coupling procedure appropriate for the bioactive agent used.

The variety of different pharmaceutical/therapeutic agents that can be used in conjunction with the methods described herein is wide and includes, but is not limited to, small molecules, proteins, antibodies, peptides and nucleic acids. In general, bioactive agents which can be administered via the invention include, without limitation: anti-infectives such as antibiotics and antiviral agents; chemotherapeutic agents (i.e. anticancer agents); anti-rejection agents; analgesics and analgesic combinations; anti-inflammatory agents; hormones such as steroids; growth factors (bone morphogenic proteins (i.e. BMP's 1-7), bone morphogenic-like proteins (i.e. GFD-5, GFD-7 and GFD-8), epidermal growth factor (EGF), fibroblast growth factor (i.e. FGF 1-9), platelet derived growth factor (PDGF), insulin like growth factor (IGF-I and IGF-II), transforming growth factors (i.e. TGF-β-III), vascular endothelial growth factor (VEGF)); anti-angiogenic proteins such as endostatin, and other naturally derived or genetically engineered proteins, polysaccharides, glycoproteins, or lipoproteins. Growth factors important for, e.g., bone growth, are described in "The Cellular and Molecular Basis of Bone Formation and Repair" by Vicki Rosen and R. Scott Thies, published by R. G. Landes Company, incorporated herein by reference. Additionally, the modified silk described herein can be used to deliver any type of molecular compound, such as, pharmacological materials, vitamins, sedatives, steroids, hypnotics, antibiotics, chemotherapeutic agents, prostaglandins, and radiopharmaceuticals. The silk coated surfaces described herein are suitable for delivery of the above materials and others including but not limited to proteins, peptides, nucleotides, carbohydrates, simple sugars, cells, genes, antithrombotics, anti-metabolics, growth factor inhibitor, growth promoters, anticoagulants, antimitotics, fibrinolytics, anti-inflammatory steroids, and monoclonal antibodies.

Examples of other biologically active agents suitable for use in the methods described herein include, but are not limited to: cell attachment mediators, such as collagen, elastin, fibronectin, vitronectin, laminin, proteoglycans, or peptides containing known integrin binding domains e.g. "RGD" integrin binding sequence, or variations thereof, that are known to affect cellular attachment (Schaffner P & Dard 2003 Cell Mol Life Sci. January; 60(1):119-32; Hersel U. et al. 2003 Biomaterials November; 24(24):4385-415); biologically active ligands; and substances that enhance or exclude particular varieties of cellular or tissue ingrowth. Such additives are particularly useful in tissue engineering applications where, for example, structures are engineered in vitro to include cells that impart a beneficial characteristic on the structure to be implanted. For example, the steps of cellular population of a 3-dimensional silk-hydroxyapatite scaffold matrix preferably are conducted in the presence of growth factors effective to promote proliferation of the cultured cells employed to populate the matrix. Agents that promote proliferation will be dependent on the cell type employed. For example, when fibroblast cells are employed, a growth factor for use herein may be fibroblast growth factor (FGF), most preferably basic fibroblast growth factor (bFGF) (Human Recombinant bFGF, UPSTATE Biotechnology, Inc.). Other examples of additive agents that enhance proliferation or differentiation include, but are not limited to, osteoinductive substances, such as bone morphogenic proteins (BMP); cytokines, growth factors such as epidermal growth factor (EGF), platelet-derived growth factor (PDGF), insulin-like growth factor (IGF-I and II) TGF-α and the like.

Modified silk coated structures can be used to deliver therapeutic agents to cells and tissues. The ability to incorporate, for example pharmaceutical agents, growth factors and other biological regulators, enzymes or possibly even cells in a modified silk coated structure described herein provides for stabilization of these components for long term release and stability, as well as better control of activity and release.

Other reagents, necessary or indicated for assisting the stability or activity of a bioactive agent can also be included in the mixtures used to create a modified silk with bioactive agents as described herein. Thus, buffers, salts or co-factors can be added as necessary.

Cells

Any type of cell can be utilized in the methods described herein. It is preferable that the cells comprise stem cells, which can be induced to differentiate into a desired lineage, however differentiated cells of any desired lineage can also be used and are contemplated herein.

In one embodiment, the modified silk polymer is coated onto or into a medical implant. A number of different cell types or combinations thereof may be employed in this embodiment, depending upon the intended function of the medical implant being produced. These cell types include, but are not limited to: smooth muscle cells, skeletal muscle cells, cardiac muscle cells, epithelial cells, endothelial cells, urothelial cells, fibroblasts, myoblasts, chondrocytes, chondroblasts, osteoblasts, osteoclasts, keratinocytes, hepatocytes, bile duct cells, pancreatic islet cells, thyroid, parathyroid, adrenal, hypothalamic, pituitary, ovarian, testicular, salivary gland cells, adipocytes, and precursor cells. For example, smooth muscle cells and endothelial cells may be employed for muscular, tubular implants, e.g., implants intended as vascular, esophageal, intestinal, rectal, or ureteral implants; chondrocytes may be employed in cartilaginous implants; cardiac muscle cells may be employed in heart implants; hepatocytes and bile duct cells may be employed in liver implants; epithelial, endothelial, fibroblast, and nerve cells may be employed in implants intended to function as replacements or enhancements for any of the wide variety of tissue types that contain these cells. In general, any cells may be employed that are found in the natural tissue to which the implant is intended to correspond. In addition, progenitor cells, such as myoblasts or stem cells, can be employed to produce their corresponding differentiated cell types. In some instances it may be preferred to use neonatal cells or tumor cells.

Cells can be obtained from donors (allogenic) or from recipients (autologous). Cells can also be of established cell culture lines, or even cells that have undergone genetic engineering. Pieces of tissue can also be used, which may provide a number of different cell types in the same structure.

Appropriate in vitro growth conditions for mammalian cells are well known in the art (Freshney, R. I. (2000) Culture of Animal Cells, a Manual of Basic Technique. Hoboken N.J., John Wiley & Sons; Lanza et al. Principles of Tissue Engineering, Academic Press; 2nd edition May 15, 2000; and Lanza & Atala, Methods of Tissue Engineering Academic Press; 1st edition October 2001). Cell culture media generally include essential nutrients and, optionally, additional elements such as growth factors, salts, minerals, vitamins, etc., that may be selected according to the cell type(s) being cultured. Particular ingredients may be selected to enhance cell growth, differentiation, secretion of specific proteins, etc. In general, standard growth media includes, for example Dulbecco's Modified Eagle Medium, low glucose (DMEM), with 110 mg/L pyruvate and glutamine, supplemented with 10-20% fetal bovine serum (FBS) or calf serum and 100 U/ml penicillin is appropriate as are various other standard media well known to those in the art. Growth conditions will vary dependent on the type of mammalian cells in use and tissue desired.

The cells that are used for methods of the present invention should be derived from a source that is compatible with the intended recipient. The cells are dissociated using standard techniques and seeded onto or into the scaffold of the implant. In vitro culturing optionally may be performed prior to implantation. Alternatively, the scaffold is implanted into the subject, allowed to vascularize, then cells are injected into the scaffold. Methods and reagents for culturing cells in vitro and implantation of a tissue scaffold are known to those skilled in the art.

Uniform seeding of cells is preferable. In theory, the number of cells seeded does not limit the final tissue produced, however optimal seeding may increase the rate of generation. The number of seeded cells can be optimized using dynamic seeding (Vunjak-Novakovic et al. Biotechnology Progress 1998; Radisic et al. Biotechnology and Bioengineering 2003).

In one embodiment, silk matrix scaffolds are seeded with multipotent cells in the presence of media that induces either bone or cartilage formation. Suitable media for the production of cartilage and bone are well known to those skilled in the art. As used herein, "multipotent" cells have the ability to differentiate into more than one cell type in response to distinct differentiation signals. Examples of multipotent cells include, but are not limited to, bone marrow stromal cells (BMSC) and adult or embryonic stem cells. In a preferred embodiment BMSCs are used. BMSCs are multipotential cells of the bone marrow which can proliferate in an undifferentiated state and with the appropriate extrinsic signals, differentiate into cells of mesenchymal lineage, such as cartilage, bone, or fat (Friedenstein, A. J. 1976. Int Rev Cytol 47:327-359; Friedenstein et al. 1987. Cell Tissue Kinet 20:263-272; Caplan, A. I. 1994. Clin Plast Surg 21:429-435; Mackay et al. 1998. Tissue Eng 4:415-428; Herzog et al. Blood. Nov. 15, 2003; 102(10):3483-93. Epub Jul. 31, 2003).

In addition, cells grown on a scaffold for the purpose of growing organs/tissues in an in ex vivo manner are also contemplated herein.

Differentiation of Stem Cells

Stem cells can be differentiated or maintained in an undifferentiated state by a number of methods known to those skilled in the art. Differentiation can be induced for example, by the addition of a chemical or biological agent (e.g, cytokines), genetic manipulation of cell-type specific markers, or addition of specific growth factors/substrates to culture media. Genetic manipulation can include for example, the over-expression of cell-type specific markers to induce stem cell differentiation into a desired lineage, or the inhibition of stem cell specific markers by RNA interference or targeted gene ablation.

In one embodiment, methods are provided for producing bone or cartilage tissue in vitro comprising culturing multipotent cells on a porous modified silk scaffold under conditions appropriate for inducing bone or cartilage formation. Suitable conditions for the generation of bone and cartilage are well known to those skilled in the art. For example, conditions for the growth of cartilage tissue often comprise nonessential amino acids, ascorbic acid-2-phosphate, dexamethasone, insulin, and TGF-β1. Suitable conditions for the growth of bone often include ascorbic acid-2-phosphate, dexamethasone, β-glycerolphosphate and BMP-2. In a preferred embodiment, ascorbic acid-2-phosphate is present at a concentration of 50 ug/ml, dexamethasone is present at a concentration of 10 nM, α-glycerolphosphate is present at a concentration of 7 mM and BMP-2 is present at a concentration of 1 ug/ml. The formation of cartilaginous tissue or bone can be monitored by assays well known to those in the art including, but not limited to, histology, immunohistochemistry, and confocal or scanning electron microscopy (Holy et al., J. Biomed. Mater. Res (2003) 65A:447-453).

Optics

In addition to the use of modified silks in implantable devices and tissue culture platforms, the modified silks disclosed herein can also be used in optical applications such as those described in PCT/US07/83642, PCT/US07/83600, PCT/US07/83620, PCT/US07/83634, PCT/US07/83639, and PCT/US07/83646, which are incorporated herein in their entirety. The ability of the modified silks, as described herein, to be tailored for specific biochemical and physical properties allows for a high degree of flexibility in optical applications such as diffraction gratings, pattern generators and lenses. Various optical applications for use with the modified silks described herein are contemplated.

It is understood that the foregoing detailed description and the following examples are illustrative only and are not to be taken as limitations upon the scope of the invention. Various changes and modifications to the disclosed embodiments, which will be apparent to those skilled in the art, can be made without departing from the spirit and scope of the present invention. Further, all patents, patent applications, and publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

EXAMPLES

Example 1

An Exemplary Method for Modifying a Silk Polymer with a Diazonium Salt

Materials and Methods

All chemicals were purchased from Aldrich, Sigma or Fluka and used without further purification. Cell medium ingredients were purchased from Invitrogen and Sigma. Cocoons from *B. mori* silkworm were obtained from Tajima Shoji Co, (Yokohama, Japan). UV-Vis data were measured with a GBC 916 spectrophotometer in water unless otherwise indicated. Infrared spectra were measured on solid films in ambient atmosphere with an Equinox 55 ATR-FTIR (Bruker, Billerica, Mass.) using an Attenuated Total Reflectance (ATR) accessory. 1H-NMR spectra were recorded with a Bruker Avance 400 NMR Spectrometer using D2O as the solvent.

Preparation of Aqueous Silk Solutions

Aqueous solutions of the silk protein were obtained using previously published methods from Altman et al, (2003); H-J. Jin J. P., et al (2005); Nazarov R., et al (2004), which are incorporated herein by reference. Cocoons from the *B. mori* silkworm were cut and boiled for 1 hour in an aqueous solution of 0.02 M $Na_2CO_3$, rinsed once with boiling water, then three times with distilled water. The purified silk fibroin was then solubilized by dissolving in a 9 M LiBr solution at 60° C. for 45 minutes giving a 20 wt % solution. This solution was filtered through a 5 μm syringe filter, then dialyzed against distilled water for 2 days, changing the water 3 times, then against borate buffer (100 mM borate, 150 mM NaCl, pH 9) for an additional day, changing the buffer 2 times. These silk solutions had a final concentration of ~9-11 wt % and could be stored in a refrigerator for at least 6 months.

Diazonium Coupling Reaction with Silk

As illustrated in FIG. 1, diazonium reactions with silk involve an electrophilic aromatic substitution reaction between the tyrosine phenolic side chains and a diazonium salt resulting in an azobenzene derivative (Kim, M S., et al (2007); Hutmacher, D W. (2000); Pielak G. J. et al., *Biochemistry*, 23:589-596 (1984), Tabachnick M. et al., *J. Biol. Chem.*, 234(7):1726-1730 (1959). Histidine residues can also be modified with this chemistry, but the contribution here is negligible as histidine comprises <1% of the amino acid content of silk (Zhou, C Z., et al (2001)).

Figure 2:
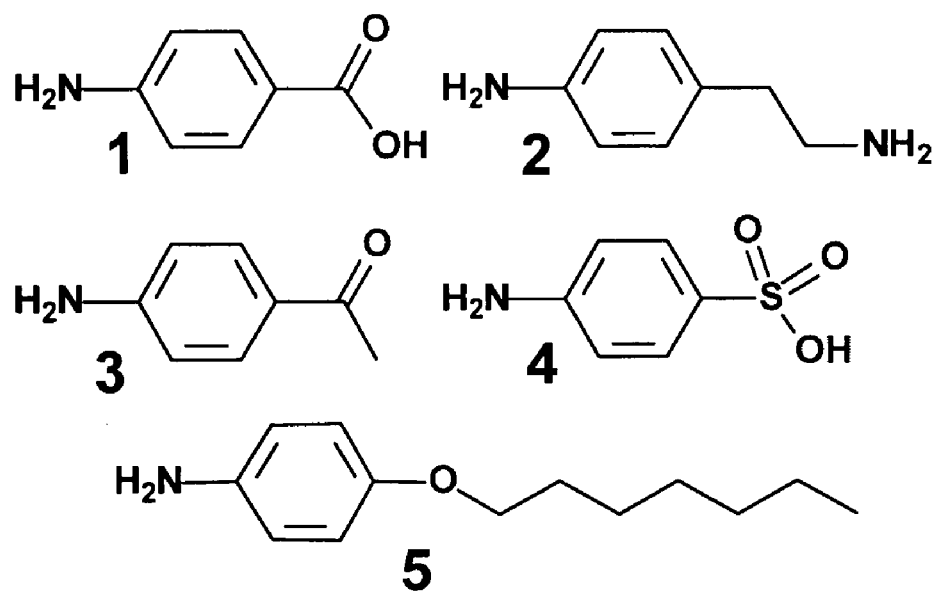
FIG. 2. depicts non-limiting examples of aniline derivatives that can be used to modify silk.

While there are many more commercially available derivatives, the anilines shown in FIG. 2 were used here to demonstrate the range of functional groups that can be incorporated into silk using this chemistry. These anilines contain carboxylic acid (1), amine (2), ketone (3), sulfonic acid (4), and alkyl (5) functional groups.

A. General Procedure

A cooled solution of 1.25 mL of a 0.2 M acetonitrile solution of aniline and 625 μL of a 1.6 M aqueous solution of p-toluenesulfonic acid, were combined with a cooled aqueous solution of 0.8 M $NaNO_2$. The mixture was vortexed briefly, and then placed in an ice bath for 15 minutes. In a typical experiment, the total reaction volume was 1 mL, where 850 μL of the silk solution was combined with 0-150 μL of the stock diazonium salt solution. In cases where less than 150 μL of the diazonium salt stock was used, the solution was diluted with a mixture of 1:1 acetonitrile/water to give a total volume of 150 μL. After combining the silk and diazonium salt, the reaction was allowed to proceed for 5-30 minutes, then purified by passing the reaction mixture through disposable Sephadex size exclusion columns (NAP-10, GE Healthcare), pre-equilibrated with distilled water. To prepare samples for $^1$H-NMR, the reaction mixture was eluted through Sephadex columns pre-equilibrated with deuterium oxide ($D_2O$). In all cases >90% of the modified protein was recovered after the reaction.

B. Silk Fibroin Control

For UV and NMR comparisons, the silk solution in borate buffer was desalted by passing the solution through a Sephadex size exclusion column pre-equilibrated with distilled water or $D_2O$. UV/Vis: $\lambda_{max\ (pH\ 7)}$=215 nm (carbonyl) and 275 nm (tyrosine)/$\lambda_{max\ (pH\ 14)}$=240 nm (carbonyl) and 290 nm (tyrosine). $^1$H NMR (400 MHz): δ 0.85 (br, 3H, Valγ), 1.16-1.18 (br, 1H), 1.35 (m, 12H, Alaβ), 2.02 (br, 1H, Valβ), 2.88-2.99 (br, 2H, Asp/Tyrβ), 3.80-3.93 (m, 16H, Serβ/Glyα), 4.26-4.30 (m, 5H, Alaα), 4.41-4.48 (m, 3H, Serα), 6.73-6.77 (m, 2H, Tyrφ), 6.95-7.03 (m, 2H Tyrφ), 7.14-7.28 (br, 1H, Trpφ).

C. 4-Aminobenzoic acid Derivative (Azosilk-1)

The diazonium salt was allowed to react with the silk for 20 minutes prior to purification. UV/vis: $\lambda_{max\ (pH\ 7)}$=329 nm (azo)/$\lambda_{max\ (pH\ 14)}$=327 and 485 nm (azo). $^1$H NMR (400 MHz): δ 0.85 (br, 3H, Valγ), 1.16-1.18 (br, 1H), 1.35 (s, 12H, Alaβ), 2.02 (br, 1H, Valβ), 2.88-2.99 (br, 3H, Asp/Tyrβ), 3.80-3.93 (m, 17H, Serβ/Glyα), 4.26-4.30 (m, 5H, Alaα), 4.41-4.48 (m, 3H, Serα), 6.71 (br, 1.5H, Tyrφ), 6.98 (br, 1.5H, Tyrφ), 7.10-7.69 (br, 2H, azo), 7.83 (br, 1H, azo).

D. 4-(2-Aminoethyl)aniline Derivative (Azosilk-2)

The diazonium salt was allowed to react with the silk for 10 minutes prior to purification. Longer reaction times resulted in protein gelation. UV/vis: $\lambda_{max\ (pH\ 7)}$=328 nm (azo). Due to low conversion to the azo derivative, no new peaks were observed in the $^1$H NMR spectra.

E. 4'-Aminoacetophenone Derivative (Azosilk-3)

The diazonium salt was allowed to react with the silk for 5 minutes prior to purification. Longer reaction times resulted in protein gelation. UV/vis: $\lambda_{max\ (pH\ 7)}$=333 nm (azo)/$\lambda_{max\ (pH\ 14)}$=336 and 505 nm (azo). Rapid protein gelation prevented acquisition of $^1$H NMR spectra.

F. 4-Sulfanilic Acid Derivative (Azosilk-4)

4-sulfanilic acid was dissolved in water instead of acetonitrile. The diazonium salt was allowed to react with the silk for 20 minutes prior to purification. UV/vis: $\lambda_{max\ (pH\ 7)}$=325 nm (azo)/$\lambda_{max\ (pH\ 14)}$=327 and 486 nm (azo). $^1$H NMR (400 MHz): 0.85 (br, 3H, Valγ), 1.16-1.18 (br, 1H), 1.35 (s, 12H, Alaβ), 1.95-2.11 (br, 1H, Valβ), 2.88-2.99 (br, 2H, Asp/Tyrβ), 3.80-3.93 (m, 20H, Serβ/Glyα), 4.26-4.30 (m, 6H, Alaα), 4.41-4.48 (s, 3H, Serα), 6.71 (br, 2H, Tyrφ), 6.98 (br, 2H, Tyrφ), 7.35-7.67 (br, 1H, azo), 7.8 (br, 0.75H, azo).

G. 4-(Heptyloxy)aniline Derivative (Azosilk-5)

The diazonium salt was allowed to react with the silk for 5 minutes prior to purification. Longer reaction times result in protein gelation. UV/vis: $\lambda_{max}$=315 nm (azo)/$\lambda_{max\ (pH\ 14)}$=323 and 481 nm (azo). Due to low conversion to the azo derivative, no new peaks were observed in the $^1$H NMR spectra.

Statistical Analysis

Statistical differences between samples were evaluated in Excel using a two-sided Student's t-test. Values with $p<0.05$ were considered significant.

Example 2

An Exemplary Method for Culturing Cells on Diazonium Modified Insoluble Silk Polymer Preparation of Silk Films for Cell Culture All five modified silk fibroin solutions were prepared as described above by combining 375 μL of each diazonium salt with 2 mL of silk solution in borate buffer diluted with 125 μL of a 1:1 acetonitrile/water mixture (approximately 0.40 equivalents of diazonium salt relative to the number of tyrosines in silk). The unmodified silk control was prepared by diluting 2 mL of silk solution in borate buffer with 500 μL of a 1:1 acetonitrile/water mixture. The modified and unmodified silk solutions were purified by passing the reaction mixture through disposable Sephadex size exclusion columns, pre-equilibrated with ultrapure water. To ensure that all small molecules and salts were removed, these solutions were passed through a second Sephadex size exclusion column, again eluting with ultrapure water. The resulting solutions had a silk concentration of ~2 wt % in water.

The silk solutions were sterilized using a 0.22 μm syringe filter in a tissue culture hood. Twenty-four-well tissue culture plates were coated with 300 μL of the modified silk solutions, as well as unmodified silk, and left to dry overnight in a laminar flow hood. To make the silk insoluble in water, the films were then soaked in 1 mL of a 70% methanol solution in water for 2 hours and then dried overnight. Prior to cell seeding, 1 mL of cell culture medium was added to each well, soaked for 30 minutes, and then aspirated.

Cell Culture

Bone marrow aspirate from a 20-year old male was obtained from Cambrex Bioscience (Walkersville, Md.). hMSCs were isolated from the aspirate by their ability to adhere to tissue culture plates. The marrow was diluted with growth medium containing high glucose Dulbecco's modified eagle medium (DMEM) supplemented with 10% fetal bovine serum, 1% antibiotic/antimycotic, 1% non-essential amino acids, and 10 ng basic fibroblast growth factor (bFGF) and was plated in tissue culture plates. The plates were kept in a humidified incubator at 37° C. and 5% CO2. At 90% confluency, the marrow was removed and the cells were detached and replated at a density of 5,000 cells/cm$^2$ giving passage 1 cells (P1). When 90% confluent, cells were detached and frozen in liquid nitrogen until ready for use (P2). In subsequent experiments, hMSCs were cultured either in growth medium described above, or osteogenic medium containing high glucose Dulbecco's modified eagle medium (DMEM) supplemented with 10% fetal bovine serum, 1% antibiotic/antimycotic, 1% non-essential amino acids, 100 nM dexamethasone, 10 mM α-glycerolphosphate, and 0.05 mM L-ascorbic acid 2-phosphate. The medium was changed every 3-4 days.

P2 cells described above were thawed, suspended in medium, and plated onto the silk films at a density of 5,000 cells/well in a 24-well plate. Cells were incubated in growth medium until they reached 80% confluence, at which time half of the wells were switched to osteogenic medium while the other half was maintained in growth medium for one week. The cell growth and shape were monitored using a phase contrast light microscope (Carl Zeiss, Jena, Germany) equipped with a Sony Exwave HAD 3CCD color video camera.

Example 3

Characterization of Exemplary Modified Silk Polymers

Carboxylic acid (1), amine (2), ketone (3), sulfonic acid (4), and alkyl (5) functional groups were used to demonstrate the range of functional groups that can be incorporated into silk using this chemistry. Pure silk fibers were dissolved in concentrated lithium bromide, and dialyzed into borate buffer prior to reaction. Silk fibroin contains about 280 tyrosine amino acids per protein (Zhou C Z, et al. *Proteins* 2001; 44(2):119-22), so the molar ratio of diazonium salt to tyrosine was tailored to produce the desired level of modification. Reaction times varied for the different anilines used, but in all cases >90% of the modified protein was recovered after the reaction.

Characterization of Azo Incorporation

Figure 3A:
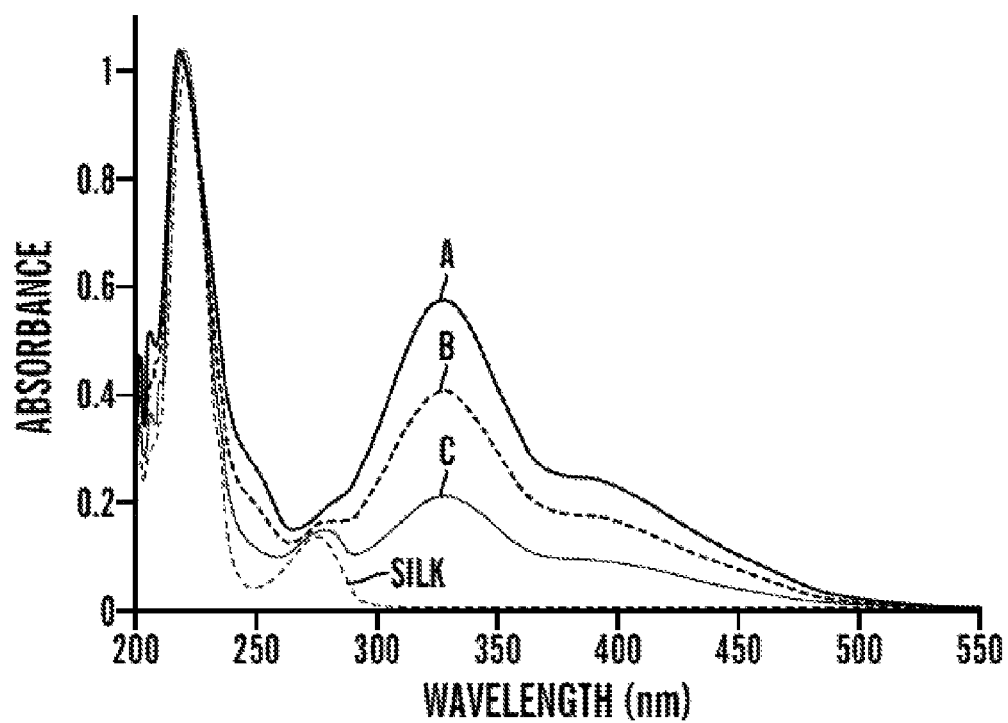
FIG. 3. depicts the characterization of an exemplary diazonium salt modified silk polymer. Examples of (a) a UV/vis spectra of a modified silk polymer; (b) 1H-NMR spectra, and (c) the percentage of estimated modified tyrosine residues are shown.

The silk protein was treated with 0.10, 0.25 or 0.40 molar equivalents of the diazonium salt of (4) relative to the number of tyrosine residues. These samples were analyzed with UV/vis and $^1$H-NMR spectroscopy and compared with unmodified silk (FIG. 3). As the equivalents increase, the tyrosine absorption at 280 nm in the native protein decreases (FIG. 3a). Likewise, a strong absorption corresponding to the newly formed azobenzene chromophore can be seen at 325 nm with a shoulder at 390 nm (Pielak G J, Mickey U S, Kozo I, Legg J I. *Biochemistry* 1984; 23:589-596. These absorptions can be assigned to the azobenzene π-π* and n-π* transitions, respectively (FIG. 3a).

Figure 3B:
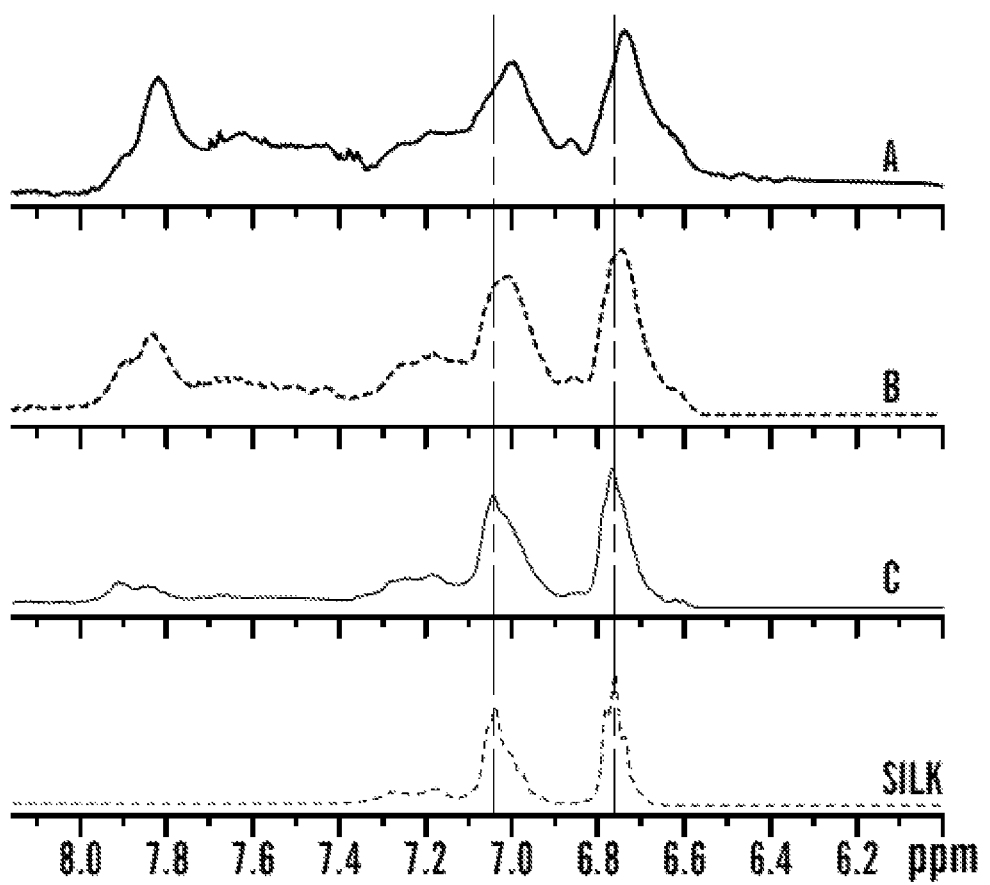

$^1$H NMR spectra of silks treated with the diazonium salt of (4) also demonstrate increasing incorporation of the azo moiety, as shown in FIG. 3b. With increasing diazonium salt equivalents, the original tyrosine peaks shift up-field and broaden while peaks consistent with the new aromatic ring in the azo group grow in (Tamada, Y. et al (2004); Antony M J, Jayakannan M. *J Phys Chem B* 2007; 111(44):12772-80; Bundi A, Wuthrich K. *Biopolymers* 1979; 18:285-297).

For each condition, the number of azo-modified tyrosines in each silk molecule was estimated using Beer's Law (FIG. 3c). The concentration of azo groups was calculated from the absorbance at 325 nm using an extinction coefficient of 22,000 M$^{-1}$ cm$^{-1}$ (Pielak G J, Mickey U S, Kozo I, Legg J I. *Biochemistry* 1984; 23:589-596; Tabachnick M, Sobotka H. *J Biol Chem* 1959; 234(7):1726-30). Silk contains approximately 280 tyrosines per molecule (Zhou, C Z. et al (2001)), so the percentage of modified tyrosines in a silk solution of known concentration can be calculated. As outlined in FIG. 3c, the number of tyrosines converted to azo derivatives was found to scale linearly with increasing diazonium salt equivalents of (4), where approximately 70% of the added diazonium salt results in azo formation.

The spectra for silks modified with (4) are shown in FIG. 3 and illustrate that the extent of protein modification was highly controlled with all of the aniline derivatives used. However, differences in reactivity were observed, particularly when using derivative (2) and (5). The diazonium coupling reaction favors anilines containing electron-withdrawing groups, such as carboxylic and sulfonic acids. Aniline derivatives (2) and (5) contain electron-donating substituents that lower the reactivity considerably.

Figure 4A:
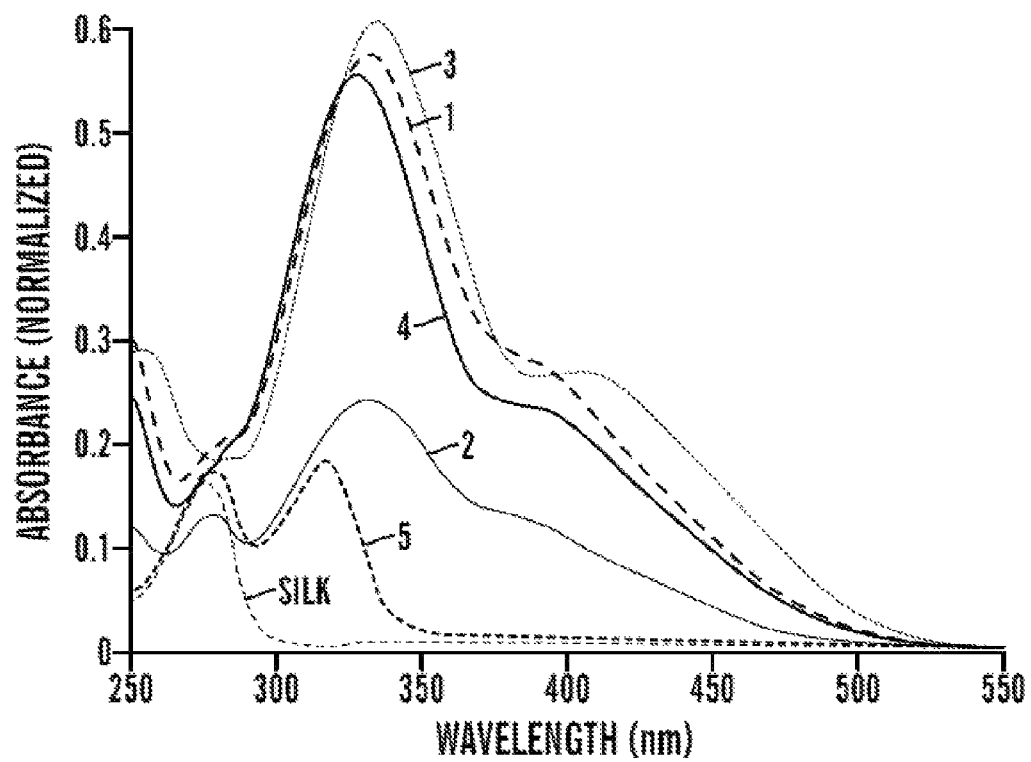
FIG. 4. shows an example of a UV/vis spectra of modified silks compared to unmodified silk.

FIG. 4a compares the UV/vis spectra of unmodified and modified silks in water at pH 7. Spectra were normalized to the carbonyl peak at 210 nm, as the contribution to the absorbance from the carbonyls in derivatives (1), (3) and (4) was found to be negligible when compared to the contribution from the amide bonds in the protein backbone. The silks were each treated with 0.4 equivalents of diazonium salt relative to the number of tyrosine residues. Addition of more equivalents of (2), (3), and (5) results in immediate gelation of the protein, so 0.4 eq was used to compare reactivity of all the derivatives side-by-side. The carboxylic acid azosilk-1, ketone azosilk-3, and sulfonic acid azosilk-4 exhibit strong absorptions for the azobenzene π-π* transition at 331, 325, and 332 nm, respectively (Pielak, G J. et al (1984); Tabachnick, M. et al (1959); Dabbagh H A, Teimouri A, Chermahini A N. *Dyes and Pigments* 2006; 73(2):239-244; Nakayama K, Endo M, Majima T. *Bioconjug Chem* 2005; 16(6):1360-6). Little or no absorption was seen at 275 nm for the native tyrosine residues. In contrast, the amino azosilk-2 and heptyloxy azosilk-5 displayed smaller peaks at 329 and 315 nm for the azo moiety, respectively, and still had significant tyrosine absorption at 275 nm. This indicates that the conversion to the azo derivative was much lower for these anilines containing electron-donating substituents.

The number of azo-modified tyrosines in each silk molecule was estimated using Beer's Law (FIG. 4b). Reported extinction coefficients range from 20-22,000 $M^{-1}$ $cm^{-1}$ for similar azobenzenes (Tabachnick, M. et al (1959); Dabbagh H A, Teimouri A, Chermahini A N. *Dyes and Pigments* 2006; 73(2):239-244; Nakayama K, et al (2005)), so for simplicity 22,000 $M^{-1}$ $cm^{-1}$ was used here for all derivatives. Using these values it was estimated that reaction with 0.4 equivalents of the electron-deficient anilines (1), (3) and (4) results in ~30% conversion of the tyrosines to azo groups. In contrast, the electron-rich anilines (2) and (5) result in ~10% conversion.

FIG. 4 shows that the differences in reactivity were further confirmed with $^1$H NMR. Peaks corresponding to the azo derivative were only observed in the spectra of carboxylic acid azosilk-1 and sulfonic acid azosilk-4 which had the highest levels of conversion. Low incorporation of the azo groups in amino azosilk-2 and heptyloxy azosilk-5 made the spectra indistinguishable from unmodified silk. From the UV/vis data, the ketone azosilk-3 also had high levels of conversion to the azo derivative. However, the samples gelled rapidly at the concentrations needed for NMR, preventing clear resolution of the peaks.

Contact Angle Measurements

The change in the overall hydrophilicity of the silk following reaction with each of these aniline derivatives was quantified using water contact angle measurements. The silk solutions were treated with 0.4 equivalents of diazonium salt, and cast onto a glass slide. After drying overnight, the silk films were treated with methanol to make the films insoluble in water.

As outlined in Table 1, films of unmodified silk fibroin have a water contact angle of ~60°. Amino azosilk-2 was found to have a similar contact angle to native silk, which is likely due to the low incorporation of the azo moiety (~30%). The carboxylic acid azosilk-1 and sulfonic acid azosilk-4 both had high levels of azo incorporation, but only the sulfonic acid derivative dramatically lowered the contact angle to 43±5°. Conversely, reaction of silk with the ketone (3) and heptyloxy (5) aniline derivatives resulted in an increase in contact angle due to incorporation of hydrophobic residues. It is interesting to note that even though the extent of reaction for derivative (5) was low (as discussed in the previous section) it still resulted in a dramatic increase in the hydrophobicity of the silk.

Infrared Spectroscopy (FTIR) Analysis of Hydrogel β-Sheet Structure

Modification of silk with the hydrophobic ketone (3) and heptyloxy (5) derivatives was found to promote β-sheet formation of the silk protein, resulting in rapid hydrogel formation. Reaction with aniline (2) also decreased the gelation time to 1-2 days. Conversely, carboxylic acid azosilk-1 and especially sulfonic acid azosilk-4 exhibited a marked decrease in the propensity for β-sheet formation. Samples of sulfonic acid azosilk-4 in solution have been stored at room temperature for >1 year, and show no signs of protein aggregation or gelation. For comparison, unmodified silk samples from the same batch were found to gel at room temperature within 1 month. While spontaneous β-sheet formation of sulfonic acid azosilk-4 in solution is inhibited, the silk is still able to form a β-sheet structure when dehydrated with organic solvents such as methanol.

The propensity of the azosilk derivatives to form a β-sheet structure can be characterized using FTIR spectroscopy (Matsumoto, A., et al (2006); Venyaminov S, Kalnin N N. *Biopolymers* 1990; 30(13-14):1259-71; Hu X, Kaplan D L, Cebe P. *Macromolecules* 2006; 39:6161-6167). The transition from a random coil to a β-sheet structure can be detected by monitoring the N—H stretch, the N—H bend and the C—N stretch in the FTIR spectrum. The peak corresponding to the N—H stretch bond vibration can be found at 1650 $cm^{-1}$ for proteins that exhibit a random coil structure. When proteins assume a β-sheet structure, the amide hydrogens participate in hydrogen bonding which shifts this peak to ~1625 $cm^{-1}$. Similarly, the N—H bend peak will shift from 1540 to 1520 $cm^{-1}$, and the C—N stretch will shift from 1230 to 1270 $cm^{-1}$ upon β-sheet formation.

The FTIR spectra for cast films of each of the modified silks are shown in FIG. 4. After treatment with 0.4 equivalents of diazonium salt relative to the number of tyrosine residues, purified solutions of the azosilks in water (3 wt %) were cast into films and dried. Ketone azosilk-3 and heptyloxy azosilk-5 at this concentration and modification level spontaneously form hydrogels within 30 minutes, so films of these silk derivatives exhibit shifts in the FTIR spectra consistent with β-sheet formation. Carboxylic acid azosilk-1, amino azosilk-2 and sulfonic acid azosilk-4 all have spectra similar to unmodified silk in a random coil conformation.

Figure 5:
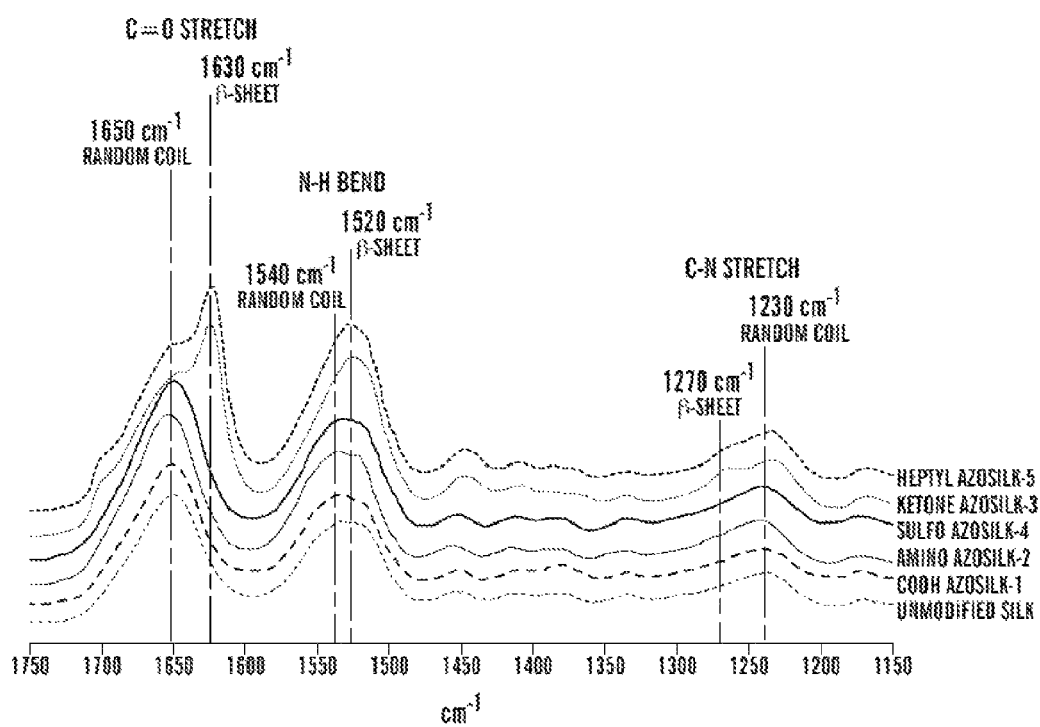
FIG. 5. shows an example ATR-FTIR spectra, which can be used to test for β-sheet formation.

FIG. 5 shows that while the FTIR spectra were useful for characterizing the structural conformation of the silk proteins, observation of the peaks corresponding to the new functional groups installed through the diazonium reaction could not be observed, as the spectra were dominated by peaks corresponding to the protein backbone.

hMSC Proliferation and Differentiation on Azosilk Films

After demonstrating that the modification of silk through this diazonium coupling strategy can change the material hydrophilicity and structure, the ability of these azosilk derivatives to support hMSC growth and differentiation was investigated. For these studies, tissue culture plates were coated with solutions of the various azosilk derivatives, dried, and treated with methanol to render the films insoluble in water. hMSCs were grown on these substrates and differentiated into an osteogenic lineage. Proliferation, morphology and gene expression were analyzed and compared to cells grown on tissue culture plastic (TCP) or unmodified silk.

Cell Proliferation

On day 4, 7, 9 and 12 cell metabolic activity was quantified using the AlamarBlue® assay (Invitrogen, #DAL1100) according to the manufacturer's instructions. Briefly, 1 mL of a solution containing basic medium (DMEM supplemented with 1% antibiotic/antimycotic and 10% FBS) with 10% alamarBlue® solution was added to 3 wells from each type of silk film or TCP, and incubated for 2 hours. A 100 µL aliquot was then taken from each well, and analyzed for fluorescence exciting at 560 nm and recording the emission at 590 nm. Background fluorescence from the alamarBlue® solution alone was subtracted, and the sample values from 3 wells of each culture were averaged.

Figure 6:
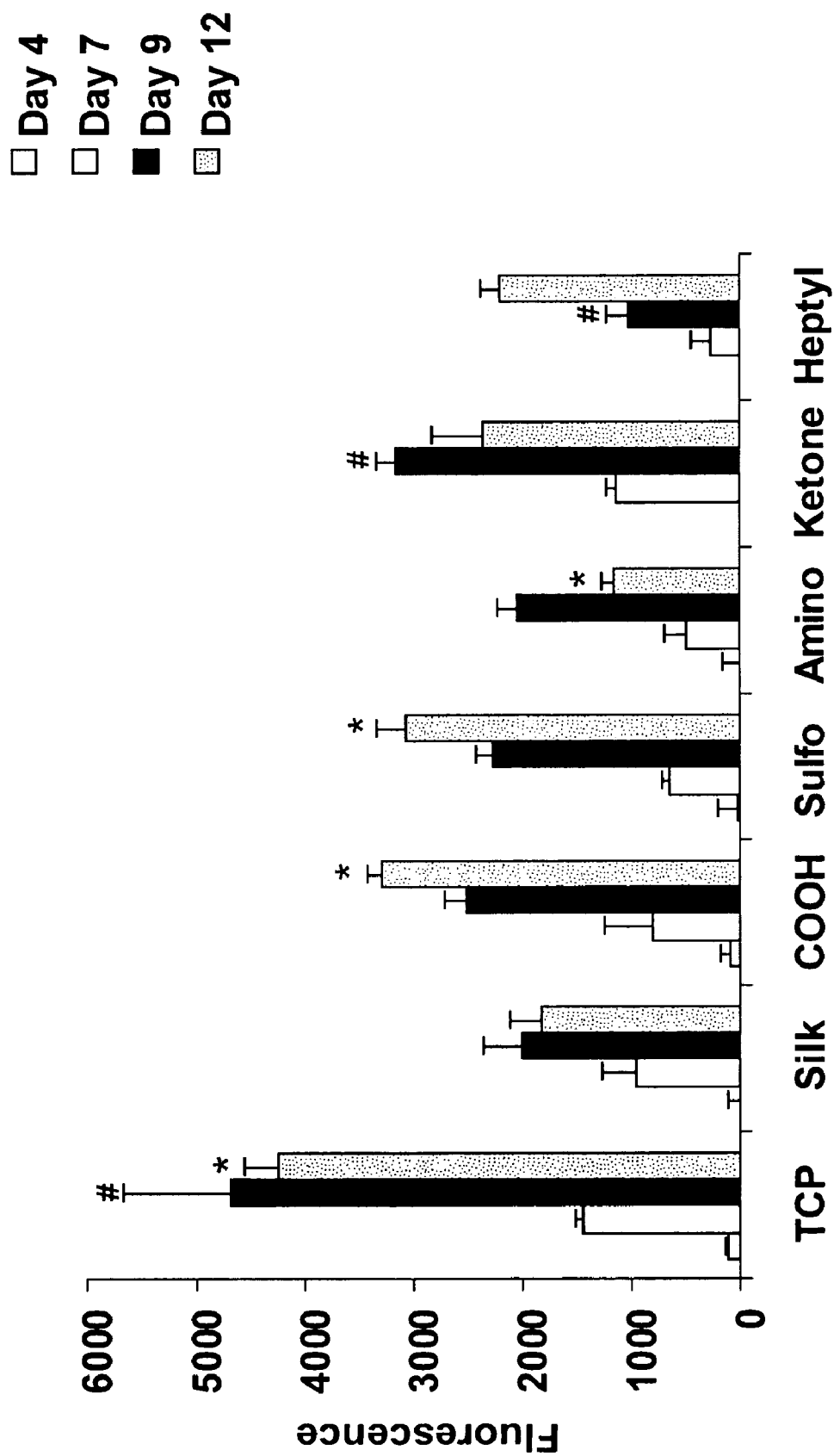
FIG. 6. depicts one example of metabolic activity of cells grown on an exemplary modified silk.

The relative proliferation rates of hMSCs grown on the different substrates were monitored using the alamarBlue® assay. As shown in FIG. 6, hMSC growth rates on the various silk derivatives were consistent up to day 7, but significant differences became apparent by day 9. In general, cells proliferated extensively up to day 9 and then exhibited only small increases or decreases in metabolic activity from day 9 to day 12. However, cells grown on the hydrophobic heptyl azosilk-5 had a slower, but increasing growth rate up to day 12. Comparison of the data from the final time point showed that there were significantly more cells on the carboxylic acid azosilk-1 and sulfonic acid azosilk-4 than on the remaining silk derivatives.

Cell Morphology

Figure 7A:
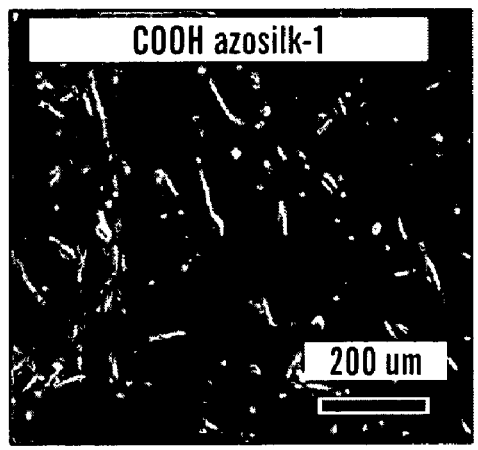
FIG. 7. shows microscope images of a representative example of cell morphology on exemplary modified silk polymers.
Figure 7A:
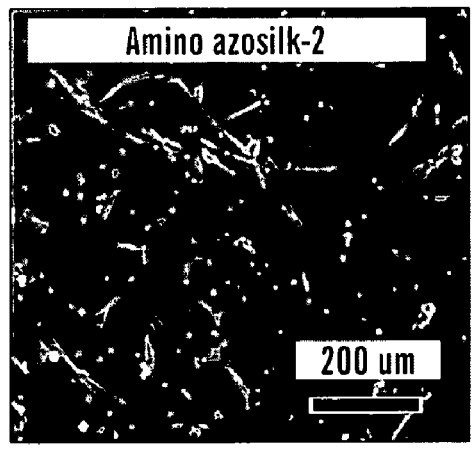
Figure 7A:
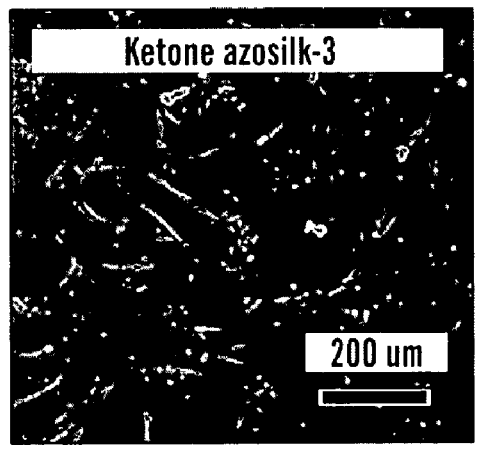
Figure 7A:
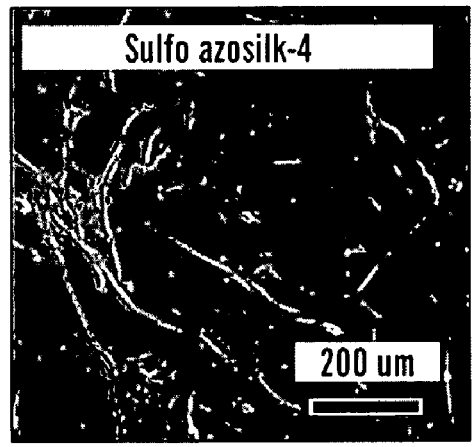
Figure 7A:
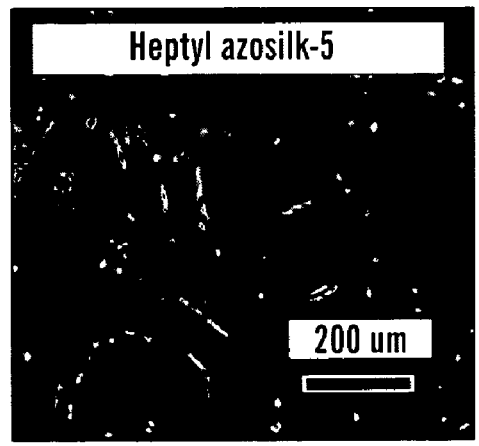
Figure 7A:
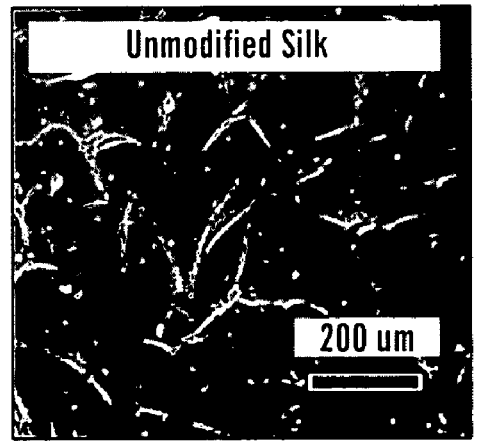
Figure 7B:
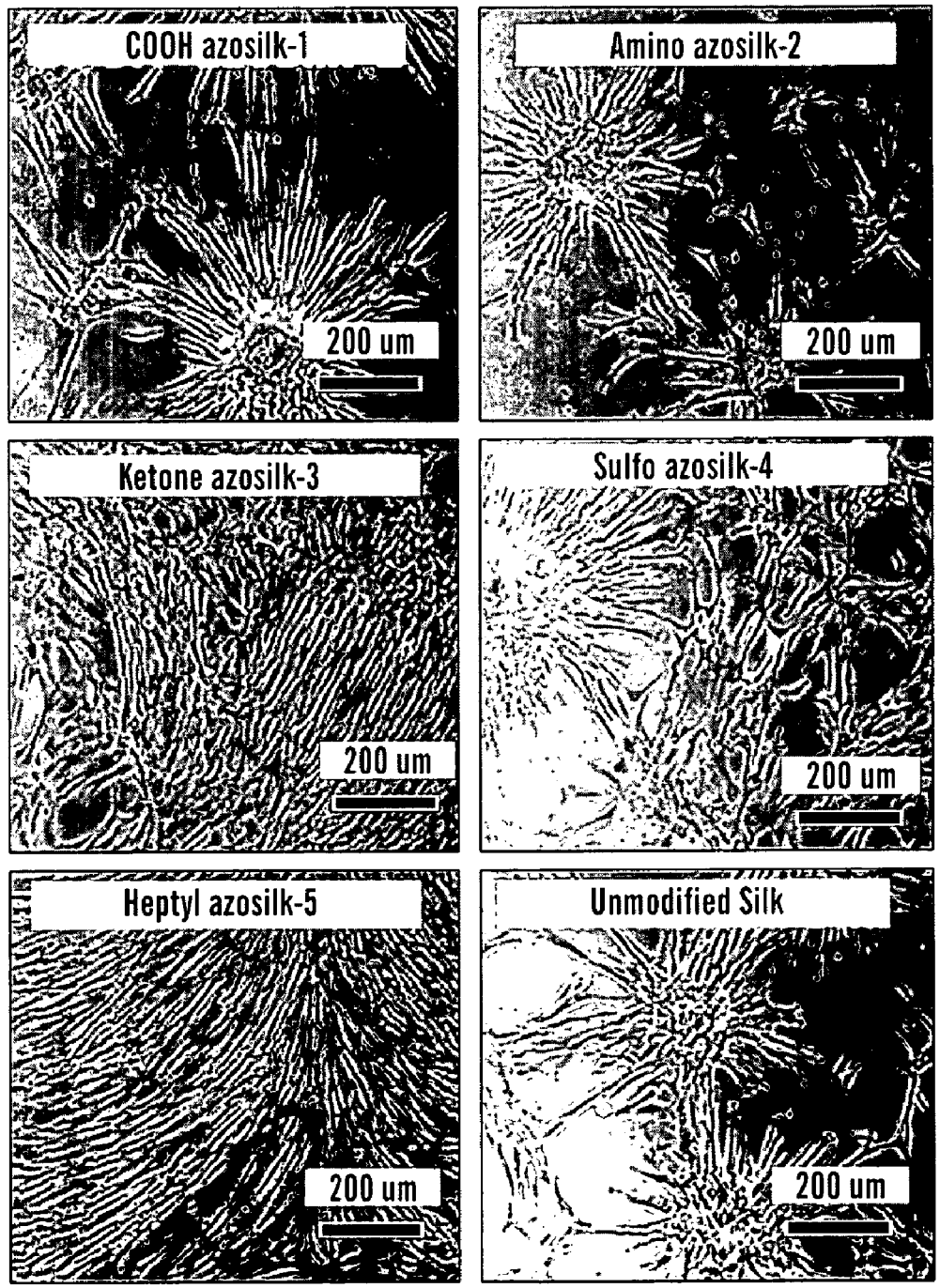

Cell viability in the monolayer cultures was assessed using a Live/Dead assay kit (Invitrogen # L-3224). The staining solution was prepared by adding 10 uL of the ethidium homodimer-1 solution to 5 mL PBS, followed by 5 uL calcein AM. The medium was aspirated from the cell wells, and washed gently with PBS 2x. Two hundred uL of the Live/Dead stain was added per well, and incubated for 30 minutes at 37° C. The stain was then aspirated and washed with PBS 2x prior to imaging. Separate fluorescence images were taken using a Carl Zeiss mercury lamp (N HBO 103 Microscope Illuminator) in conjunction with blue (450-490 nm) and green (510-560 nm) filters. The color images were merged using WCIF Image J software.

hMSCs were able to attach and spread on all of the silk derivatives, and exhibited similar cell densities and morphologies up to day 5 (FIG. 7*a*). However, dramatic differences in morphology were observed when the hMSCs reached ~70% confluence (FIG. 7*b*). hMSCs grown on hydrophobic ketone azosilk-3 and heptyloxy azosilk-5 silk grew evenly across the surface and exhibited spindle-shaped morphologies similar to cells grown on TCP. These morphologies are typical of undifferentiated hMSCs, which take on a fibroblastic cell shape. Cells grown on unmodified silk or silks modified with amino, carboxylic acid or sulfonic acid functional groups were also spindle-shaped, but they tended to form large star-like clusters rather than forming a monolayer.

Figure 8:
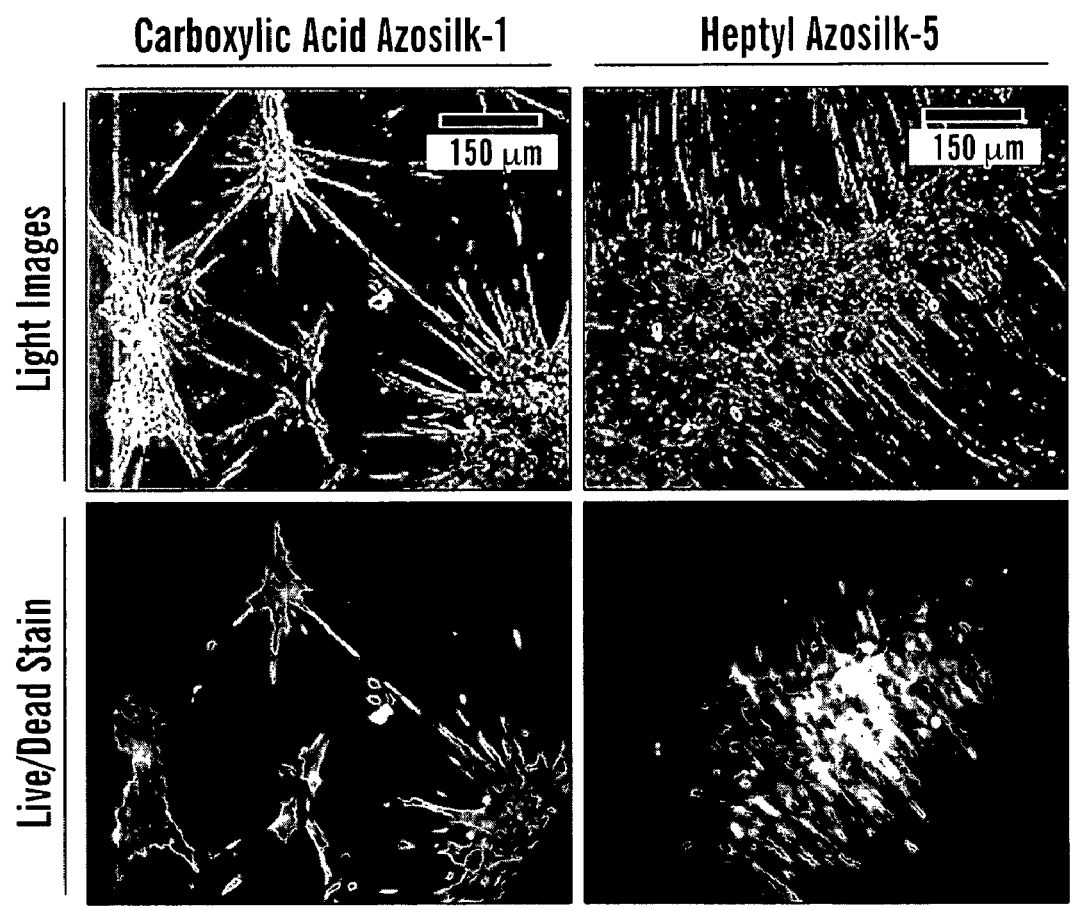
FIG. 8. shows representative microscope images of live cells grown on exemplary modified silk polymers.

In order to determine if the cell clustering seen on the hydrophilic substrates was a result of cell death, cell viability was assessed using a Live/Dead assay and imaged with a fluorescent microscope. Representative images are shown in FIG. 8 for hMSCs grown on carboxylic acid azosilk-1 and heptyl azosilk-5. All of the cells fluoresce green indicating that even the clustered cells are still viable. The small amount of red seen in the image for heptyl azosilk-5 is likely due to the autofluorescence of silk at this wavelength (Georgakoudi I, Tsai I, Greiner C, Wong Po Foo C, DeFelice J, Kaplan D L. *Optics Express* 2007; 15(3):1043-1053) as the phase contrast images reveal that there are no cells in those regions.

Cell Adhesion via Integrins

After one week of osteogenic stimulation, the cells in each well were lysed in 0.35 mL Buffer RLT (Qiagen) containing 10% mercaptoethanol, followed by shredding in a QIAshedder (Qiagen #79656). RNA was isolated from the cells using an RNeasy Mini Kit (Qiagen #74106). From this RNA, cDNA was synthesized using a High Capacity cDNA Reverse Transcription Kit (Applied Biosystems #4368814) following the manufacturer's instructions. The cDNA samples were analyzed for expression of α-procollagen I, alkaline phosphatase, osteopontin, bone sialoprotein, and integrin subunits αv, β3, α5 and β1 relative to the GAPDH housekeeping gene using Assay-on-Demand® Gene Expression kits with TaqMan® Universal PCR Master Mix (ABI #4364340). (Applied Biosystems AoD probes: Col I #Hs00164004_m1, ALP #Hs00240993_m1, BSP # Hs00173720_m1, OP # Hs00167093_m1, αv #Hs00233808_m1, β3 #Hs00173978_m1, α5 #Hs00233743_m1, β1 #Hs00236976_m1, GAPDH #Hs00240993_m1) The data was analyzed using the ABI Prism 7000 Sequence Detection Systems software. For each sample, the Ct value was defined as the cycle number at which the amplification of each target gene was in the linear range of the reaction. Relative expression levels of each gene were calculated by normalizing to the Ct value of the housekeeping gene GAPDH ($2^{\Delta Ct}$, Perkin Elmer User Bulletin #2). Data from three separate cultures of each type were averaged.

Figure 9:
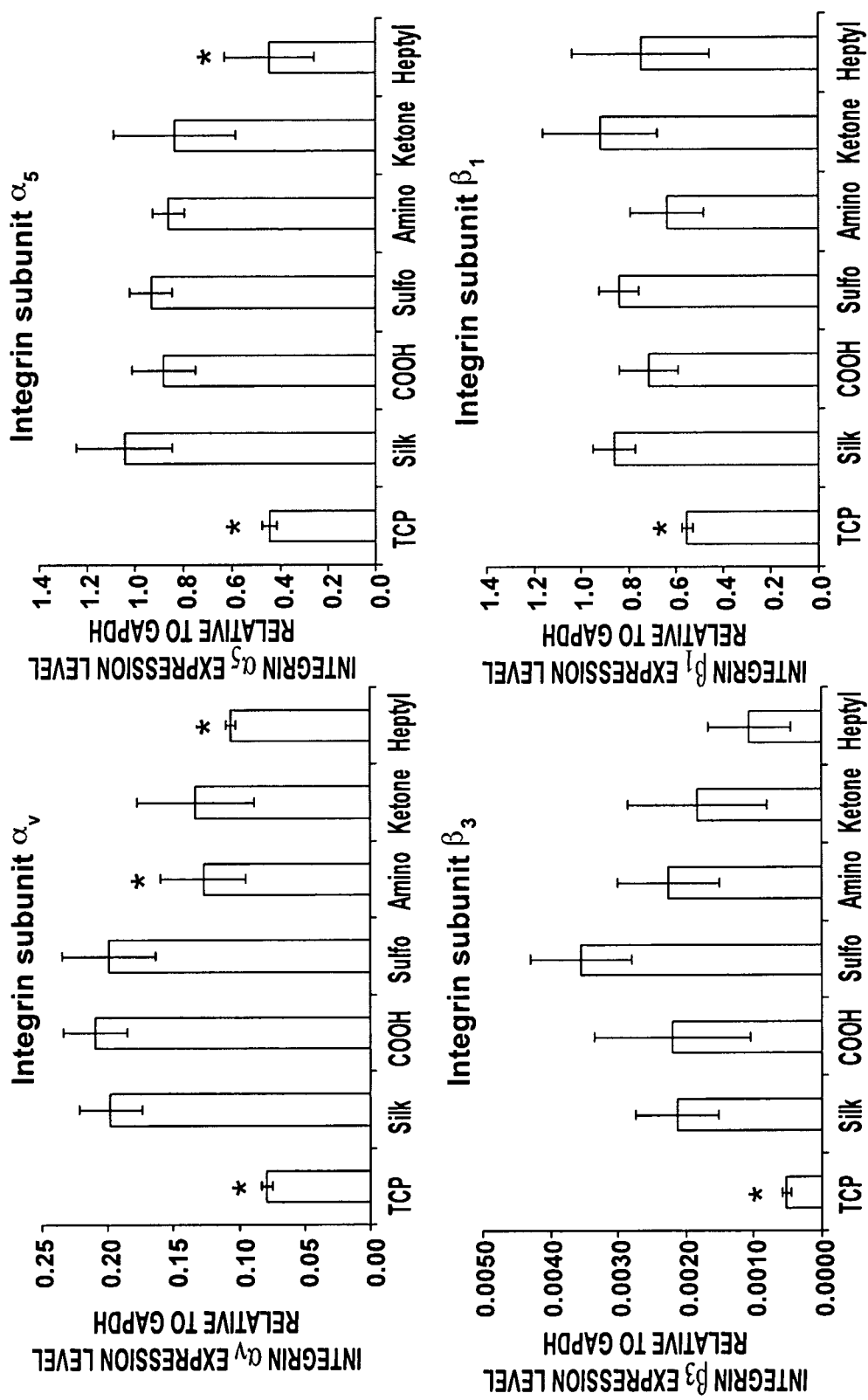
FIG. 9. is a series of graphs that illustrate the use of RT-PCR to measure expression levels of exemplary cell adhesion markers in a culture of cells.

To evaluate if cell surface integrins played a role in cell adhesion and morphology on the various silk surfaces, expression of integrin subunits $\alpha_v$, $\beta_3$, $\alpha_5$ and $\beta_1$ at day 12 were quantified using real time RT-PCR. As shown in FIG. 9, expression of the αv subunit was highest for cells grown on hydrophilic surfaces (contact angle <60°), including unmodified silk, carboxylic acid azosilk-1 and sulfonic acid azosilk-4. Cells grown on amino azosilk-2, heptyl azosilk-5, and TCP had significantly lower $\alpha_v$ expression when compared to cells grown on unmodified silk. Similarly, $\alpha_5$ expression was lowest for cells grown on TCP and the hydrophobic heptyl azosilk-5. Expression of the $\beta_3$ integrin subunit was also lower in cells grown on the hydrophobic heptyl azosilk-5 as compared to cells on unmodified silk, but the difference was not as significant as for $\alpha_v$ expression. No statistical difference in expression levels of the $\beta_1$ integrin subunit was found in cells grown on the various silk derivatives.

Osteogenic Differentiation

In addition to morphology and growth, hMSCs on the silk derivatives were evaluated for the ability to differentiate into an osteogenic lineage. At approximately 80% confluence, half of the cells were subjected to osteogenic stimulants and cultured for an additional week. A summary of osteogenic gene expression using real time RT-PCR analysis is shown in FIG. 10.

Taken as a whole, there were no clear trends in the up or down regulation of osteogenic markers in cells grown on the various azosilk derivatives. Therefore, the modification of silk with azo groups in general does not significantly affect the ability of hMSCs to differentiate into an osteogenic lineage. However, a few trends were seen within specific genes that were analyzed. Expression of α-procollagen I was lower for silk derivatives with either a higher (sulfonic acid azosilk-4) or lower hydrophilicity (ketone azosilk-3 and heptyl azosilk-5) than silk. Osteopontin expression was also lower for cells grown on the more hydrophobic silks. Significant up-regulation when compared to unmodified silk was only found in bone sialoprotein transcript expression in cells grown on the carboxylic acid azosilk-1.

Summary

A new method for modifying silk fibroin proteins using diazonium coupling chemistry is described herein. Silk is mainly composed of non-reactive amino acids leaving few options for functionalization. However, methods of the present invention can be used to install small molecules with various functional groups including sulfonic and carboxylic acids, amines, ketones and alkanes. Silk fibroin is very stable in the basic conditions necessary for this reaction, thus the methods described herein are suitable for modifying tyrosine residues in the silk protein. In addition, the reaction is rapid, usually requiring less than 20 minutes, and all the necessary reagents are commercially available.

Fibroin has a high molecular weight of ~390,000 daltons (Zhou, C Z., et al (2001)) so many standard protein analysis techniques, such as mass spectral analysis and gel electrophoresis, are not readily amenable to this protein. However, the extent of the diazonium coupling with these aniline derivatives could be followed with UV/vis and $^1$H-NMR spectroscopy. It was concluded that the diazonium reaction was efficient using anilines with electron-withdrawing substituents (1, 3 and 4), where ~70% of the diazonium salt added resulted in azo formation. In contrast, only ~20% of the added diazonium salt formed azo derivatives when using anilines with electron-donating substituents (2 and 5).

Incorporation of anilines (1-5) were found to alter the overall hydrophilicity of silk, resulting in hydrophilic (sulfonic acid azosilk-4) and hydrophobic (ketone azosilk-3 and heptyl azosilk-5) silk analogs. This chemical modification also influenced the fibroin protein structure, where incorporation of sulfonic acid groups was found to inhibit β-sheet self-assembly, while addition of low levels of hydrophobic groups catalyzed β-sheet assembly resulting in rapid hydrogel formation. A new method has recently been reported using ultrasonication to induce rapid silk hydrogel formation (Wang X, Kluge J A, Leisk G G, Kaplan D L. *Biomaterials* 2008; 29, 8, 1054-1064). The chemical modification strategy outlined here provides an additional method to reproducibly prepare silk hydrogels. By controlling the level of tyrosine modification or adjusting the concentration of the silk solution, the gelation time can be tailored to occur anywhere from 5 minutes to 2 hours after modification.

The influence of the hydrophilicity of the silk derivatives on hMSC attachment and proliferation of hMSCs were also evaluated. The initial attachment, morphology and proliferation rates were the same for hMSCs grown on all of the silk derivatives for the first 5 days. However, differences in growth and morphology became apparent after culturing the cells for ~7 days. hMSCs were able to adhere and rapidly proliferate on all the silk derivatives with a water contact angle <70°, but exhibited a slower growth rate on the more hydrophobic heptyl azosilk-5. These data are consistent with other observations in the literature that cells prefer to adhere to and proliferate on surfaces with a moderate hydrophilicity (water contact angle=50-70°) (Kim, M S., et al (2007); Grinnel, F. (1978)). Differences in morphology were also seen as the cells reached confluence. Cells on the hydrophilic carboxylic acid azosilk-1, amino azosilk-2, and sulfonic acid azosilk-4 surfaces formed large cell clusters, seemingly preferring to adhere to each other over the substrate. In contrast, hMSCs formed monolayers on the hydrophobic ketone azosilk-3 and heptyl azosilk-5.

To determine whether cell surface integrins played a role in the observed change in cell morphology on hydrophilic (contact angle <70°) vs. hydrophobic (contact angle >70°) silk surfaces, expression of the subunits of $\alpha_v\beta_3$ and $\alpha_5\beta_1$ integrins were evaluated at transcript levels. The $\alpha_v\beta_3$ integrin is known to adhere to proteins such as bone sialoprotein, fibronectin, fibrinogen, and laminin (Hubbell, J A. (1995)) and plays a role in cell migration. In contrast, the $\alpha_5\beta_1$ integrin binds to regions within fibronectin (Hubbell, J A. (1995)) and is necessary for forming focal adhesion sites. Expression of $\alpha_v$ was much lower in cells grown on the hydrophobic silk derivatives in the present study. This result is consistent with the literature, where is has been shown that cells grown on hydrophobic surfaces express lower levels of $\alpha_v$ and $\beta_3$ (Lim, JY., et al (2005)). In addition, it has been shown that $\alpha_v\beta_3$ and $\alpha_5\beta_1$ have a much lower binding affinity to hydrophobic monolayers (Keselowsky, B G., et al (2004). Endothelial cells have been shown to increase expression of $\alpha_v\beta_3$ and decrease expression of $\alpha_5\beta_1$ during wound healing to facilitate cell migration (Gao B, Saba T M, Tsan M F. *Am J Physiol Cell Physiol* 2002; 283(4):C1196-205), and over-expression of $\alpha_v\beta_3$ also been linked to an increase in cell motility in cancer cells (Vacca A, Ria R, Presta M, Ribatti D, Iurlaro M, Merchionne F, et al. *Exp Hematol* 2001; 29(8):993-1003). Therefore, the rearrangement of the cells into large clusters when grown on the hydrophilic surfaces may be due to an increase in $\alpha_v\beta_3$ expression, which could enhance the migratory ability of these cells. Conversely, cells grown on the hydrophobic silks and TCP express lower levels of $\alpha_v\beta_3$ which could inhibit motility.

Following stimulation, hMSCs grown on all of the new silk derivatives were found to express osteogenic markers, demonstrating that these azosilks can support differentiation. Regardless of the hydrophilicity of the surface on which they were grown, all of the hMSCs expressed similar levels of the $\alpha_5\beta_1$ integrin which is important for osteogenic differentiation (Takeuchi Y, et al. *J Biol Chem* 1997; 272(46):29309-16; Xiao G, et al. *J Biol Chem* 1998; 273(49):32988-94; Keselowsky B G, et al. *J Biomed Mater Res A* 2007; 80(3): 700-10). Relative up or down regulation of the specific transcripts associated with osteogenesis varied slightly between the azosilks, but overall differentiation appeared to be unaffected when compared to the control. Further studies are underway to evaluate hMSC differentiation in 3-dimensional scaffolds of these azosilks to ascertain whether derivatives with higher surface charge (carboxylic acid azosilk-1 and sulfonic acid azosilk-4) can facilitate mineralization during osteogenesis (Chen, J., et al (2006); Goissis, G., et al (2003)).

Modification of silk fibroin using diazonium coupling chemistry provides a simple route to controlling protein structure and overall hydrophilicity. When hydrophobic and hydrophilic silk derivatives are used as cell culture scaffolds, cells display different growth rates and morphologies. However, hMSCs grown on all the silk derivatives are able to express osteogenic markers when subjected to osteogenic stimuli regardless of the silk hydrophilicity. These data indicate that this versatile chemistry is useful for studies of silk structure and assembly, while also providing new options for cell cultivation.

The contents of all references cited below, and throughout this application, are incorporated herein by reference.

TABLE 1

Water contact angle values after modification of silk with azosilk 1-5.

| Silk Derivative | Contact Angle |
| --- | --- |
| Unmodified Silk | 58 ± 5° |
| Carboxylic Acid Azosilk-1 | 60 ± 3° |

TABLE 1-continued

Water contact angle values after modification of silk with azosilk 1-5.

| Silk Derivative | Contact Angle |
| --- | --- |
| Amino Azosilk-2 | 56 ± 3° |
| Ketone Azosilk-3 | 78 ± 6° |
| Sulfonic Acid Azosilk-4 | 43 ± 5° |
| Heptyl Azosilk-5 | 84 ± 6° |

The invention claimed is:

1. A method for producing a modified silk composition, the method comprising the steps of:
   (a) contacting a diazonium salt with a silk polymer solution to form a modified silk mixture, and
   (b) transforming said modified silk mixture into an insoluble state
to form a modified silk composition.

2. A method for producing a modified silk composition, the method comprising the steps of:
   (a) transforming a silk polymer solution into an insoluble state, and
   (b) contacting a diazonium salt with said silk polymer in an insoluble state
to form a modified silk composition.

3. The method of claim 1 or 2, wherein said contacting comprises mixing said silk polymer and said diazonium salt to form a substantially homogeneous mixture.

4. The method of claim 1 or 2, wherein said silk polymer contains at least one tyrosine residue and said diazonium salt contains at least one chemical moiety.

5. The method of claim 4, wherein the contacting involves reacting at least one of the chemical moieties of the diazonium salt with the tyrosine residue of said silk polymer.

6. The method of claim 5, wherein said chemical moiety is selected from the group consisting of a sulfonic acid group, a carboxylic acid group, an amine group, a ketone group, an alkyl group, an alkoxy group, a thiol group, a disulfide group, a nitro group, an aromatic group, an ester group, an amide group, and a hydroxyl group.

7. The method of claim 1 or 2, wherein the insoluble silk polymer is hydrophilic.

8. The method of claim 1 or 2, wherein the insoluble silk polymer is hydrophobic.

9. The method of claim 1 or 2, wherein said silk polymer solution further comprises a bioactive agent.

10. The method of claim 9, wherein said bioactive agent is selected from the group consisting of a small molecule, a protein, a polypeptide, and a nucleic acid.

11. The method of claim 9, wherein said bioactive agent is bonded to said chemical moiety.

12. The method of claim 1 or 2, wherein said silk polymer further comprises a mineral.

13. The method of claim 12, wherein said mineral is contacted with said silk polymer, prior to contact with said diazonium salt.

14. The method of claim 12, wherein said mineral is contacted with said silk polymer, after said contact with said diazonium salt.

15. The method of claim 12, wherein said mineral is biocompatible with bone or cartilage.

16. The method of claim 1, wherein said silk polymer solution further comprises a therapeutic agent.

17. The method of claim 16, wherein the therapeutic agent is selected from the group consisting of a small molecule, a protein, a polypeptide, and a nucleic acid.

18. The composition of claim 17, wherein the therapeutic agent is selected from the group consisting of anti-infectives, antibiotics, antiviral agents, chemotherapeutic agents, anti-rejection agents, analgesics and analgesic combinations, anti-inflammatory agents, hormones, growth factors, bone morphogenic-like proteins, epidermal growth factor (EGF), fibroblast growth factor, platelet derived growth factor (PDGF), insulin like growth factor (IGF-I and IGF-II), transforming growth factors, vascular endothelial growth factor (VEGF)), anti-angiogenic proteins, anti-thrombotics, anti-metabolics, growth factor inhibitors, growth promoters, anti-coagulants, antimitotics, fibrinolytics, sedatives, hypnotics, prostaglandins, radiopharamacuticals, cell attachment mediators, and peptides containing integrin binding domains.

19. The method of claim 2, wherein said silk polymer solution further comprises a therapeutic agent.

20. The method of claim 19, wherein the therapeutic agent is selected from the group consisting of a small molecule, a protein, a polypeptide, and a nucleic acid.

21. The composition of claim 20, wherein the therapeutic agent is selected from the group consisting of anti-infectives, antibiotics, antiviral agents, chemotherapeutic agents, anti-rejection agents, analgesics and analgesic combinations, anti-inflammatory agents, hormones, growth factors, bone morphogenic-like proteins, epidermal growth factor (EGF), fibroblast growth factor, platelet derived growth factor (PDGF), insulin like growth factor (IGF-I and IGF-II), transforming growth factors, vascular endothelial growth factor (VEGF)), anti-angiogenic proteins, anti-thrombotics, anti-metabolics, growth factor inhibitors, growth promoters, anti-coagulants, antimitotics, fibrinolytics, sedatives, hypnotics, prostaglandins, radiopharamacuticals, cell attachment mediators, and peptides containing integrin binding domains.

22. A composition of modified silk, the composition comprising silk polymer that has been modified by (a) a reaction with a diazonium salt having at least one chemical moiety, and (b) a transformation into the insoluble state.

23. The composition of claim 22, wherein said silk polymer further comprises a bioactive agent.

24. The composition of claim 23, wherein said bioactive agent is selected from the group consisting of a small molecule, a protein, a polypeptide, and a nucleic acid.

25. The composition of claim 23, wherein said bioactive agent is bonded to said chemical moiety.

26. The composition of claim 22, wherein said chemical moiety is selected from the group consisting of a sulfonic acid group, a carboxylic acid group, an amine group, a ketone group, an alkyl group, an alkoxy group, a thiol group, a disulfide group, a nitro group, an aromatic group, an ester group, an amide group, and a hydroxyl group.

27. The composition of claim 22, wherein the silk polymer contains at least one tyrosine residue.

28. The composition of claim 27, wherein said chemical moiety is bonded to the tyrosine residue of said silk polymer.

29. The composition of claim 28, wherein the insoluble silk polymer is hydrophilic.

30. The composition of claim 28, wherein the insoluble silk polymer is hydrophobic.

31. The composition of claim 22, wherein said silk polymer further comprises a mineral.

32. The composition of claim 31, wherein said mineral is biocompatible with bone or cartilage.

33. The composition of claim 22, wherein said silk polymer further comprises a therapeutic agent.

34. The composition of claim 33, wherein the therapeutic agent is selected from the group consisting of a small molecule, a protein, a polypeptide, and a nucleic acid.

35. The composition of claim 33, wherein the therapeutic agent is selected from the group consisting of anti-infectives, antibiotics, antiviral agents, chemotherapeutic agents, anti-rejection agents, analgesics and analgesic combinations, anti-inflammatory agents, hormones, growth factors, bone morphogenic-like proteins, epidermal growth factor (EGF), fibroblast growth factor, platelet derived growth factor (PDGF), insulin like growth factor (IGF-I and IGF-II), transforming growth factors, vascular endothelial growth factor (VEGF)), anti-angiogenic proteins, anti-thrombotics, anti-metabolics, growth factor inhibitors, growth promoters, anti-coagulants, antimitotics, fibrinolytics, sedatives, hypnotics, prostaglandins, radiopharamacuticals, cell attachment mediators, and peptides containing integrin binding domains.

36. The composition of claim 33, wherein the therapeutic agent is bonded to the chemical moiety.

37. A kit for modifying silk, the kit comprising:
   a. Silk polymer
   b. Diazonium salt,
   c. Packaging materials therefor.

* * * * *